United States Patent
Lei

(10) Patent No.: US 11,955,658 B2
(45) Date of Patent: Apr. 9, 2024

(54) BATTERY CELL AND MANUFACTURING METHOD AND MANUFACTURING SYSTEM THEREOF, BATTERY AND POWER CONSUMPTION APPARATUS

(71) Applicant: CONTEMPORARY AMPEREX TECHNOLOGY CO., LIMITED, Ningde (CN)

(72) Inventor: Yuyong Lei, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 99 days.

(21) Appl. No.: 17/894,931

(22) Filed: Aug. 24, 2022

(65) Prior Publication Data

US 2023/0031476 A1 Feb. 2, 2023

Related U.S. Application Data

(63) Continuation of application No. PCT/CN2021/109404, filed on Jul. 29, 2021.

(51) Int. Cl.
*H01M 50/367* (2021.01)
*H01M 50/147* (2021.01)

(52) U.S. Cl.
CPC ....... *H01M 50/367* (2021.01); *H01M 50/147* (2021.01); *H01M 2220/20* (2013.01)

(58) Field of Classification Search
CPC ........................ H01M 50/147; H01M 50/367
See application file for complete search history.

(56) References Cited

U.S. PATENT DOCUMENTS 3,940,287 A 2/1976 Urry
9,653,725 B2 * 5/2017 Nagai ................... H01M 4/366
(Continued)

FOREIGN PATENT DOCUMENTS

CN 109686874 A 4/2019
CN 112103443 A 12/2020
(Continued)

OTHER PUBLICATIONS

Machine translation of CN 112688019 (no date) (Year: 0000).*
(Continued)

*Primary Examiner* — Amanda C. Walke
(74) *Attorney, Agent, or Firm* — Kilpatrick Townsend & Stockton LLP

(57) ABSTRACT

The present application provides a battery cell and a manufacturing method and manufacturing system, a battery, and a power consumption apparatus. The battery cell includes an electrode assembly, a housing, a pressure relief mechanism and a cover assembly. The housing is provided with an accommodating space for accommodating the electrode assembly, and the housing includes a first side plate located on a side in a first direction; the pressure relief mechanism is disposed on the first side plate; and the cover assembly is configured for sealing the housing, where an inner surface of the first side plate of the housing is provided with a first flow channel extending along the inner surface, and the first flow channel is configured to guide a gas in the accommodating space to the pressure relief mechanism so that the pressure relief mechanism is actuated when a pressure reaches a threshold, and relieve the pressure.

16 Claims, 14 Drawing Sheets

(56) References Cited

U.S. PATENT DOCUMENTS

| | | | |
|---|---|---|---|
| 2009/0075158 A1* | 3/2009 | Rudorff | H01M 10/6556 |
| | | | 429/53 |
| 2010/0062322 A1 | 3/2010 | Murata | |
| 2013/0171482 A1 | 7/2013 | Phillips et al. | |
| 2017/0331090 A1 | 11/2017 | Li et al. | |
| 2022/0320679 A1* | 10/2022 | Li | H01M 10/613 |
| 2022/0416360 A1* | 12/2022 | Pu | H01M 50/375 |
| 2023/0344071 A1* | 10/2023 | Yang | H01M 50/15 |

FOREIGN PATENT DOCUMENTS

| | | |
|---|---|---|
| CN | 112688019 A | 4/2021 |
| CN | 213692271 U | 7/2021 |
| JP | S50128830 A | 10/1975 |
| JP | 2014197512 A | 10/2014 |
| JP | 2019145478 A | 8/2019 |
| JP | 2021096950 A | 6/2021 |

OTHER PUBLICATIONS

Contemporary Amperex Technology Co., Limited, International Search Report and Written Opinion, PCT/CN2021/109404, dated Mar. 2, 2021, 18 pgs.

Decision to grant a patent receiving in the corresponding Japanese application 2022-549349, dated Oct. 2, 2023.

The extended European search report received in the corresponding European application 21926051.0, dated Oct. 10, 2023.

\* cited by examiner

BATTERY CELL AND MANUFACTURING METHOD AND MANUFACTURING SYSTEM THEREOF, BATTERY AND POWER CONSUMPTION APPARATUS

CROSS-REFERENCE TO RELATED APPLICATIONS

This application is a continuation application of PCT Patent Application No. PCT/CN2021/109404, entitled "BATTERY CELL AND ITS MANUFACTURING METHOD AND MANUFACTURING SYSTEM, BATTERY AND ELECTRIC DEVICE" filed on Jul. 29, 2021, which is incorporated herein by reference in its entirety.

TECHNICAL FIELD

Embodiments of the present application relate to the field of batteries, and more particularly, to a battery cell and a manufacturing method and manufacturing system thereof, a battery, and a power consumption apparatus.

BACKGROUND

A battery cell is widely used in an electronic device, such as a mobile phone, a notebook computer, an electromobile, an electric vehicle, an electric airplane, an electric ship, an electric toy car, an electric toy ship, an electric toy airplane, and an electric tool. The battery cell may include a nickel-cadmium battery cell, a nickel-hydrogen battery cell, a lithium-ion battery cell, a secondary alkaline zinc-manganese battery cell, and the like.

In the development of battery technology, in addition to improving performance of the battery cell, safety is also an issue that cannot be ignored. If the safety of the battery cell cannot be ensured, the battery cell cannot be used. Therefore, how to enhance the safety of the battery cell is an urgent technical problem to be solved in the battery technology.

SUMMARY

Embodiments of the present application provide a battery cell and a manufacturing method and manufacturing system thereof, a battery, and a power consumption apparatus, which could enhance safety of the battery cell.

According to a first aspect of the present application, an embodiment of the present application provides a battery cell, including an electrode assembly, a housing, a pressure relief mechanism, and a cover assembly. The housing is provided with an accommodating space for accommodating the electrode assembly, where the housing includes a first side plate located on a side in a first direction; the pressure relief mechanism is disposed on the first side plate; and the cover assembly is configured for sealing the housing, where an inner surface of the first side plate of the housing is provided with a first flow channel extending along the inner surface, and the first flow channel is configured to guide a gas in the accommodating space to the pressure relief mechanism so that the pressure relief mechanism is actuated when a pressure reaches a threshold, and relieve the pressure. The first flow channel includes a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel.

In the above solution, in the embodiment of the present application, a first flow channel is disposed on a first side plate of a housing, and the first flow channel includes a first intermediate flow channel and a first edge flow channel. When a battery cell releases a gas during thermal runaway, the first edge flow channel can guide the gas to flow from an accommodating space along an edge of the housing and move to the first intermediate flow channel, and then guide the gas to a pressure relief mechanism through the first intermediate flow channel, so that the pressure relief mechanism is actuated in time and relieves the gas, so as to improve an exhaust rate during the thermal runaway of the battery cell, and improve safety of the battery cell.

In some embodiments, the first intermediate flow channel includes a first intermediate groove disposed on the inner surface of the first side plate, one end of the first intermediate groove communicates with the pressure relief mechanism, and the other end of the first intermediate groove communicates with the first edge flow channel. When thermal runaway occurs in the battery cell, the released gas can be guided from the accommodating space to the pressure relief mechanism along the first intermediate groove to be discharged, which will not affect gas exhausting due to blockage of the electrode assembly, increases an exhaust rate during the thermal runaway of the battery cell, and improves safety of the battery cell. At the same time, the first intermediate groove is disposed on the inner surface of the first side plate so as not to occupy the accommodating space and thus energy density of the battery cell is not affected.

In some embodiments, there are a plurality of the first intermediate grooves, and each of the first intermediate grooves communicates with the pressure relief mechanism and the first edge flow channel.

In some embodiments, at least two of the first intermediate grooves are parallel to each other, which is beneficial to improve exhaust efficiency in a length direction of the first intermediate grooves. Alternatively, the plurality of first intermediate grooves extend to a periphery in a divergent shape with the pressure relief mechanism as a center, which is beneficial to improve exhaust efficiency in a circumferential direction of the pressure relief mechanism.

In some embodiments, the first edge flow channel includes a first edge groove disposed at a circumferential edge of the inner surface of the first side plate and extending along the circumferential edge, and each of the first intermediate grooves communicates with the first edge groove. By setting the first edge groove, the gas can move to the nearest first intermediate groove through the first edge groove and be guided to the pressure relief mechanism to be discharged, which shortens a movement path of the gas, makes gas exhausting smoother, and improves exhaust efficiency. In addition, if a certain one of the first intermediate grooves is blocked, the gas can also move to another first intermediate groove through the first edge groove to be discharged, which improves reliability of gas exhausting.

In some embodiments, the first edge groove is an annulus or a notched annulus, or the first edge groove includes a plurality of sub-grooves spaced apart along the circumferential edge.

In some embodiments, a first protruding part protruding toward the accommodating space is formed on the inner surface of the first side plate, the first protruding part has a top surface away from the inner surface, and the first intermediate flow channel and the first edge flow channel are formed in a space between the top surface of the first protruding part and the inner surface. In this embodiment, the top surface of a first protruding part is used to support the electrode assembly, and the first intermediate flow channel and the first edge flow channel are formed in the space between the top surface of the first protruding part and the inner surface, which will not affect gas exhausting due to blockage of the electrode assembly, increases the exhaust rate during the thermal runaway of the battery cell, and improves the safety of the battery cell.

In some embodiments, the first intermediate flow channel includes a plurality of first intermediate sub-flow channels; there are a plurality of the first protruding parts, the plurality of first protruding parts extend to a periphery in a divergent shape with the pressure relief mechanism as a center, and one of the first intermediate sub-flow channels is formed between two adjacent first protruding parts and the inner surface of the first side plate; the housing includes a pair of second side plates disposed opposite to each other in a second direction perpendicular to the first direction; the housing further includes a pair of third side plates disposed opposite to each other in a third direction perpendicular to the first direction and the second direction; and a gap is disposed between an end of each of the first protruding parts away from the pressure relief mechanism and an adjacent second side plate or an adjacent third side plate, and the gap forms a portion of the first edge flow channel. By setting the plurality of first protruding parts that extend to the periphery in the divergent shape with the pressure relief mechanism as the center, the first intermediate flow channel and the first edge flow channel are formed, which can improve exhaust efficiency in the circumferential direction of the pressure relief mechanism. In addition, if a certain one of the first intermediate sub-flow channels is blocked, the gas can also move to another first intermediate sub-flow channel through the first edge flow channel to be discharged, which improves the reliability of gas exhausting.

In some embodiments, an insulating layer is disposed on the top surface of the first protruding part, the insulating layer is configured to realize insulation between the electrode assembly and the housing, and there is no need to provide an additional support member, which reduces occupation of the space, and is beneficial to improve energy density of the battery cell without affecting the gas exhausting of the battery cell.

In some embodiments, starting from a position where the first intermediate flow channel communicates with the pressure relief mechanism, a depth of at least a portion of a length of the first intermediate flow channel gradually decreases in a direction away from the pressure relief mechanism. Further, a depth of at least a portion of a length of the first intermediate flow channel gradually increases in a direction close to the pressure relief mechanism, so as to form a slope inclined toward the gas exhausting direction of the pressure relief mechanism, which is more beneficial to guide the gas to the pressure relief mechanism to be discharged, and improves exhaust efficiency.

In some embodiments, a support member is disposed between the first side plate and the electrode assembly to support the electrode assembly, where the support member has a first surface and a second surface disposed opposite to each other, the first surface faces the first side plate, and the second surface faces the electrode assembly; and a second flow channel is disposed on the first surface of the support member, and the first intermediate flow channel and the accommodating space are in communication through the second flow channel. The second flow channel is formed on the support member so that the first intermediate flow channel and the accommodating space are in communication, which can increase a cross-sectional area of a flow channel of gas exhausting, and improve exhaust efficiency.

In some embodiments, the second flow channel matches the first flow channel in shape. The shape of the second flow channel matches the shape of the first flow channel, and after combination, the cross-sectional area of the flow channel of gas exhausting can be increased, and the exhaust efficiency can be improved.

In some embodiments, the support member includes a first through hole penetrating the support member in the first direction, and the first intermediate flow channel and the accommodating space are in communication through the first through hole.

In some embodiments, an insulating film is further included to wrap a portion of the electrode assembly and separate the electrode assembly and the housing, where the insulating film includes a first side film located between the electrode assembly and the support member; and the first side film includes a second through hole penetrating the first side film in the first direction, and a projection of the second through hole does not overlap with a projection of the first through hole on the first direction. The projection of the second through hole of the first side film of the insulating film does not overlap with the projection of the first through hole of the support member in the first direction, which can achieve reliable insulation between the electrode assembly and the first side plate, enable the second through hole of the first side film of the insulating film to be matched with the first through hole of the support member, allow the gas in the accommodating space to enter the pressure relief mechanism through the second through hole, the first through hole and the first intermediate flow channel to be discharged, and improve exhaust efficiency of the inner space of the insulating film.

According to a second aspect of the present application, there is provided a battery including the battery cell of the first aspect.

According to a third aspect of the present application, there is provided a power consumption apparatus including the battery of the second aspect.

In some embodiments, the power consumption apparatus is a vehicle, a ship or a spacecraft.

According to a fourth aspect of the present application, there is provided a manufacturing method of a battery cell, including: providing an electrode assembly; providing a housing, where the housing is provided with an accommodating space for accommodating the electrode assembly; and the housing includes a first side plate located on a side in a first direction; providing a pressure relief mechanism disposed on the first side plate; providing a cover assembly for sealing the housing; and assembling the electrode assembly, the housing, the pressure relief mechanism and the cover assembly to form the battery cell, where the providing the housing includes forming on an inner surface of the first side plate of the housing a first flow channel extending along the inner surface, and the first flow channel is configured to guide a gas in the accommodating space to the pressure relief mechanism so that the pressure relief mechanism is actuated when a pressure reaches a threshold, and relieves the pressure; and the first flow channel includes a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel.

According to a fifth aspect of the present application, there is provided a manufacturing system of a battery cell, including: an electrode assembly providing apparatus for providing an electrode assembly; a housing providing apparatus for providing a housing, where the housing is provided with an accommodating space for accommodating the electrode assembly; and the housing includes a first side plate located on a side in a first direction; a pressure relief mechanism providing apparatus for providing a pressure relief mechanism, where the pressure relief mechanism is disposed on the first side plate; a cover assembly providing apparatus for providing a cover assembly for sealing the housing; and an assembly apparatus for assembling the electrode assembly, the housing, the pressure relief mechanism and the cover assembly to form the battery cell, where an inner surface of the first side plate of the housing is provided with a first flow channel extending along the inner surface, and the first flow channel is configured to guide a gas in the accommodating space to the pressure relief mechanism so that the pressure relief mechanism is actuated when a pressure reaches a threshold, and relieves the pressure; and the first flow channel includes a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel.

According to a battery cell and a manufacturing method and manufacturing system thereof, a battery and a power consumption apparatus provided by the present application, exhaust efficiency can be improved during thermal runaway of the battery cell, and safety of the battery cell can be improved.

BRIEF DESCRIPTION OF THE DRAWINGS

The accompanying drawings described herein are used to provide further understanding of the present application and constitute a part of the present application, and exemplary embodiments of the present application and description thereof are used to explain the present application and do not constitute an undue limitation to the present application. In the drawings.

Figure 1:
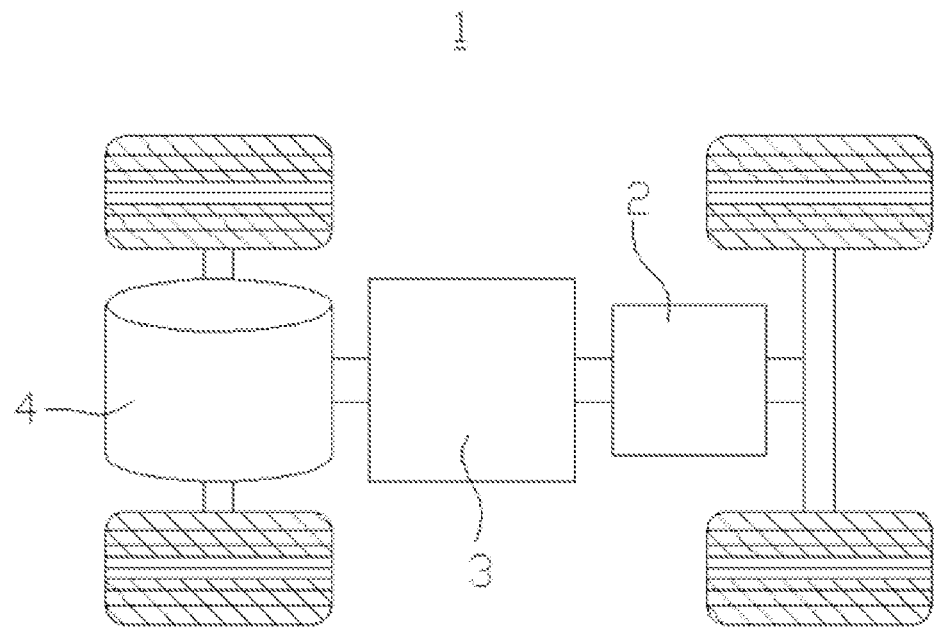
FIG. 1 is a schematic structural diagram of a vehicle provided by some embodiments of the present application.

In the drawings, the drawings are not drawn to actual scale.

DESCRIPTION OF EMBODIMENTS

To make the objectives, technical solutions and advantages of embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art in the technical field to which the present application belongs. Terms used in the specification of the present application are merely for the purpose of describing specific embodiments, but are not intended to limit the present application. Terms "comprising" and "having" as well as any variation thereof in the specification and the claims as well as the foregoing description of the accompanying drawings of the present application are intended to cover non-exclusive inclusions. Terms "first", "second", and the like in the specification and the claims or the above drawings of the present application are used to distinguish different objects, rather than to describe a specific order or a primary-secondary relationship.

Phrase "embodiments" referred to in the present application means that specific features, structures or characteristics described in combination with embodiments can be included in at least one embodiment of the present application. The phrase at various locations in the specification does not necessarily refer to the same embodiment, or an independent or alternative embodiment exclusive of another embodiment.

In the description of the present application, it should be noted that unless otherwise explicitly specified and defined, terms "mounting", "connecting", "connection" and "attaching" should be understood in a broad sense, for example, it may be a fixed connection, a detachable connection, or an integrated connection; and it may be a direct connection, an indirect connection via an intermediate medium, or communication between the interiors of two elements. Those of ordinary skill in the art may understand specific meanings of the foregoing terms in the present application according to specific situations.

In the present application, term "and/or" is only an association relation describing associated objects, which means that there may be three relations. For example, A and/or B may represent three situations: A exists alone, both A and B exist, and B exists alone. In addition, a character "/" in the present application generally indicates that associated objects before and after the character are in an "or" relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions such as the overall thickness, length and width of an integrated apparatus are merely illustrative, and should not constitute any limitation to the present application.

In the present application, phrase "a plurality of" means two or more (including two).

In the present application, a battery cell may include a lithium-ion secondary battery cell, a lithium-ion primary battery cell, a lithium-sulfur battery cell, a sodium/lithium-ion battery cell, a sodium-ion battery cell or a magnesium-ion battery cell, etc., which is not limited by the embodiment of the present application. The battery cell may be cylindrical, flat, cuboid or in other shapes, which is not limited by the embodiment of the present application. The battery cell is generally divided into three types according to the way of packaging: a cylindrical battery cell, a prismatic battery cell and a pouch battery cell, which is also not limited by the embodiment of the present application.

A battery mentioned in an embodiment of the present application refers to a single physical module that includes one or more battery cells to provide a higher voltage and capacity. For example, the battery mentioned in the present application may include a battery module, a battery pack, or the like. The battery generally includes a box for enclosing one or more battery cells. The box can prevent a liquid or other foreign matters from affecting the charging or discharging of the battery cell.

The battery cell includes an electrode assembly and an electrolyte, and the electrode assembly includes a positive electrode plate, a negative electrode plate and a separator. The operation of the battery cell mainly relies on movement of metal ions between the positive electrode plate and the negative electrode plate. The positive electrode plate includes a positive electrode current collector and a positive active substance layer, and the positive active substance layer is coated on a surface of the positive electrode current collector. The positive electrode current collector includes a positive electrode current collecting part and a positive electrode protruding part protruding from the positive electrode current collecting part, the positive electrode current collecting part is coated with the positive active substance layer, at least part of the positive electrode protruding part is not coated with the positive active substance layer, and the positive electrode protruding part is used as a positive tab. In an example of a lithium-ion battery, the material of the positive electrode current collector may be aluminum, the positive active substance layer includes a positive active substance, and the positive active substance may be lithium cobalt oxide, lithium iron phosphate, ternary lithium, lithium manganate, or the like. The negative electrode plate includes a negative electrode current collector and a negative active substance layer, and the negative active substance layer is coated on a surface of the negative electrode current collector. The negative electrode current collector includes a negative electrode current collecting part and a negative electrode protruding part protruding from the negative electrode current collecting part, the negative electrode current collecting part is coated with the negative active substance layer, at least part of the negative electrode protruding part is not coated with the negative active substance layer, and the negative electrode protruding part is used as a negative tab. The material of the negative electrode current collector may be copper, the negative active substance layer includes a negative active substance, and the negative active substance may be carbon or silicon, or the like. In order to ensure that no fusing occurs when a large current passes, positive tabs are plural in number and are stacked together, and negative tabs are plural in number and are stacked together. The material of the separator may be polypropylene (PP), polyethylene (PE), or the like. In addition, the electrode assembly may be in a winding structure or a laminated structure, and the embodiment of the present application is not limited thereto.

The battery cell may further include a housing assembly, and the housing assembly has an accommodating cavity inside, and the accommodating cavity is a closed space provided by the housing assembly for the electrode assembly and the electrolyte.

For the battery cell, a main safety hazard comes from charging and discharging processes, and a suitable ambient temperature design is also required. In order to avoid unnecessary loss effectively, at least triple protection measures are generally taken for the battery cell. Specifically, the protection measures at least include a switching element, a properly selected separator material and a pressure relief mechanism. The switching element refers to an element that may stop charging or discharging of a battery when a temperature or a resistance of the battery cell reaches a certain threshold. The separator is configured to separate a positive electrode plate and a negative electrode plate and can automatically dissolve micron-sized (or even nano-sized) micro-pores attached to the separator when temperature rises to a certain value, so that metal ions are prevented from passing through the separator and an internal reaction of the battery cell is terminated.

The pressure relief mechanism refers to an element or a part that is actuated when an internal pressure of the battery cell reaches a predetermined threshold, to relieve the internal pressure. The threshold design varies according to different design requirements. The threshold may depend on the material of one or more of the positive electrode plate, the negative electrode plate, the electrolytic solution and the separator in the battery cell. The pressure relief mechanism may take the form of an explosion-proof valve, an air valve, a pressure relief valve or a safety valve, etc., and may specifically adopt a pressure-sensitive element or structure. That is, when the internal pressure of the battery cell reaches the predetermined threshold, the pressure relief mechanism performs an action or a weakened structure disposed in the pressure relief mechanism is fractured, so as to form an opening or a channel for relieving the internal pressure or temperature.

The word "actuated" mentioned in the present application means that the pressure relief mechanism performs an action or is activated to a certain state, so that the internal pressure of the battery cell can be relieved. The action performed by the pressure relief mechanism may include but be not limited to: at least a portion of the pressure relief mechanism is fractured, broken, torn or opened, and so on. When the pressure relief mechanism is actuated, high temperature and high pressure substances inside the battery cell are discharged to the outside from an actuated position as emissions. In this way, the pressure of the battery cell can be relieved under a controllable pressure, so as to avoid potentially more serious accidents.

The emissions from the battery cell mentioned in the present application include but are not limited to: the electrolytic solution, dissolved or split positive and negative electrode plates, fragments of the separator, a high temperature and high pressure gas generated by reaction, flame, and the like.

The pressure relief mechanism on the battery cell has an important impact on the safety of the battery cell. For example, when short circuit, overcharge and other phenomena occur, it may lead to thermal runaway inside the battery cell and a further sudden increase in pressure. In this case, the internal pressure can be released to the outside through the actuation of the pressure relief mechanism, so as to prevent the battery cell from exploding and catching fire.

The pressure relief mechanism is usually mounted in the housing assembly. The inventors found that, in order to improve energy density of the battery cell, a space for gas flow inside the battery cell is limited, which results in a low rate of gas exhausting during thermal runaway. In addition, the pressure relief mechanism may be shielded by a component inside the housing assembly, which results in poor exhaust and a potential safety hazard.

In view of this, an embodiment of the present application provides a technical solution. In the technical solution, a battery cell includes an electrode assembly, a housing, a pressure relief mechanism and a cover assembly. Specifically, the housing is provided with an accommodating space for accommodating the electrode assembly; the housing includes a first side plate located on a side in a first direction; the pressure relief mechanism is disposed on the first side plate; and the cover assembly is configured for sealing the housing, where an inner surface of the first side plate of the housing is provided with a first flow channel extending along the inner surface, and the first flow channel is configured to guide a gas in the accommodating space to the pressure relief mechanism so that the pressure relief mechanism is actuated when a pressure reaches a threshold, and relieves the pressure. The first flow channel includes a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel. The battery cell having this structure guides a high temperature and high pressure gas to the pressure relief mechanism during thermal runaway, so as to increase an exhaust rate and improve safety performance.

The technical solution described in the embodiment of the present application is applicable to a battery and a power consumption apparatus using the battery.

The power consumption apparatus may be a vehicle, a mobile phone, a portable device, a notebook computer, a ship, a spacecraft, an electric toy, an electric tool, and so on. The vehicle may be a fuel vehicle, a gas vehicle or a new energy vehicle; the new energy vehicle may be a pure electric vehicle, a hybrid vehicle or an extended range vehicle, etc.; the spacecraft includes an airplane, a rocket, a space shuttle and a spaceship, etc.; the electric toy includes a fixed or mobile electric toy, such as a game console, an electric vehicle toy, an electric ship toy and an electric airplane toy, etc.; the electric tool includes a metal cutting power tool, a grinding power tool, an assembly power tool and a railway power tool, such as an electric drill, an electric grinder, an electric wrench, an electric screwdriver, an electric hammer, an impact drill, a concrete vibrator, an electric planer, etc. The above power consumption apparatus is not specially limited in the embodiment of the present application.

For convenience of description, the following embodiments are explained by an example that the power consumption apparatus is a vehicle.

FIG. 1 is a schematic structural diagram of a vehicle provided by some embodiments of the present application. As shown in FIG. 1, an interior of a vehicle 1 is provided with a battery 2, and the battery 2 may be disposed at the bottom, head or tail of the vehicle 1. The battery 2 may be used for power supply of the vehicle 1. For example, the battery 2 may serve as an operation power supply of the vehicle 1.

The vehicle 1 may further include a controller 3 and a motor 4. The controller 3 is used to control the battery 2 to supply power to the motor 4, for example, for starting, navigating, and working power requirements during driving of the vehicle 1.

In some embodiments of the present application, the battery 2 may serve not only as an operation power source of the vehicle 1, but also as a driving power source of the vehicle 1, replacing or partially replacing fuel or natural gas to provide driving power for the vehicle 1.

Figure 2:
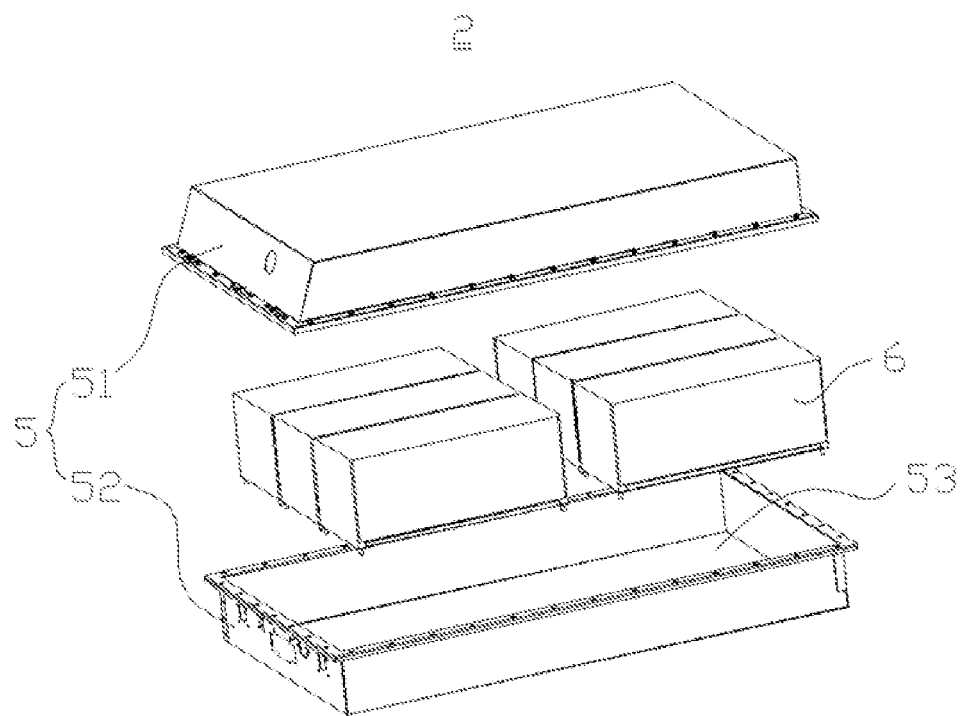
FIG. 2 is a schematic exploded view of a battery provided by some embodiments of the present application.

FIG. 2 is a schematic exploded view of a battery provided by some embodiments of the present application. As shown in FIG. 2, a battery 2 includes a box 5 and a battery cell (not shown in FIG. 2), and the battery cell is accommodated in the box 5.

The box 5 is configured to accommodate the battery cell, and the box 5 may have various structures. In some embodiments, the box 5 may include a first box portion 51 and a second box portion 52, the first box portion 51 and the second box portion 52 are covered with each other, and the first box portion 51 and the second box portion 52 together define an accommodating space 53 for accommodating the battery cell. The second box portion 52 may be a hollow structure with one side open, the first box portion 51 is a plate-like structure, and the first box portion 51 covers an opening side of the second box portion 52 to form the box 5 having the accommodating space 53. The first box portion 51 and the second box portion 52 may also both be a hollow structure with one side open, and an opening side of the first box portion 51 covers an opening side of the second box portion 52 to form the box 5 having the accommodating space 53. Of course, the first box portion 51 and the second box portion 52 may have various shapes, such as a cylinder, a cube, or the like.

In order to improve the airtightness after the first box portion 51 and the second box portion 52 are connected, a sealing member, such as a sealant, a sealing ring, or the like, may also be disposed between the first box portion 51 and the second box portion 52.

Assuming that the first box portion 51 covers the top of the second box portion 52, the first box portion 51 may also be referred to as an upper box cover, and the second box portion 52 may also be referred to as a lower box.

In the battery 2, the battery cell may be one or plural in number. If the battery cell is plural in number, a plurality of battery cells may be connected in series or in parallel or in series and parallel. The series and parallel connection means that the plurality of battery cells are connected in series and in parallel. The plurality of battery cells may be directly connected in series or in parallel or in series and parallel, and then a whole formed by the plurality of battery cells may be accommodated in the box 5. Of course, the plurality of battery cells may also be first connected in series or in parallel or in series and parallel to form a battery module 6, and then a plurality of battery modules 6 are connected in series or in parallel or in series and parallel to form a whole, and are accommodated in the box 5.

Figure 3:
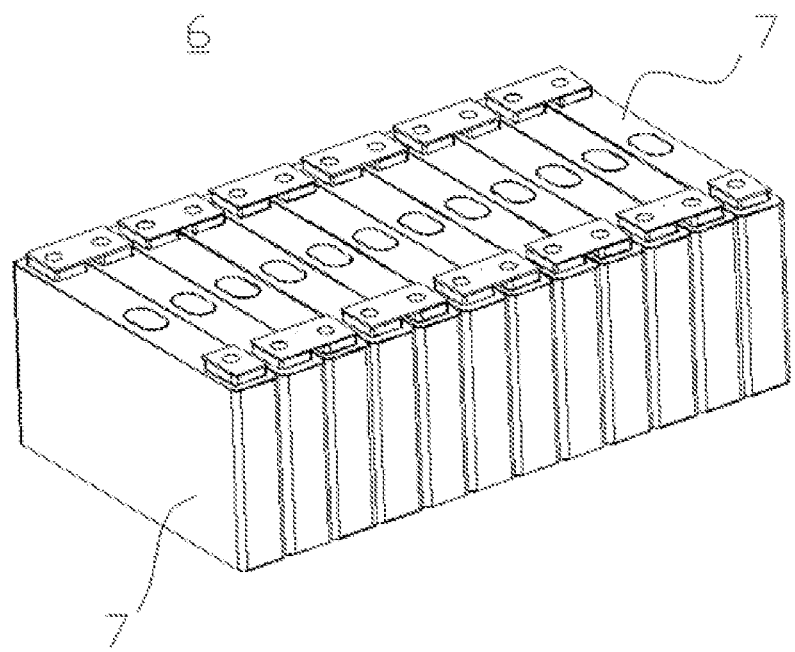
FIG. 3 is a schematic structural diagram of a battery module shown in FIG. 2.

FIG. 3 is a schematic structural diagram of the battery module shown in FIG. 2. As shown in FIG. 3, in some embodiments, there are a plurality of battery cells 7, and the plurality of battery cells 7 are first connected in series or in parallel or series and parallel to form the battery module 6. A plurality of battery modules 6 are then connected in series or in parallel or in series and parallel to form a whole, and are accommodated in the box.

The plurality of battery cells 7 in the battery module 6 may be electrically connected through a bus component to realize the parallel, or series or series and parallel connection of the plurality of battery cells 7 in the battery module 6.

Figure 4:
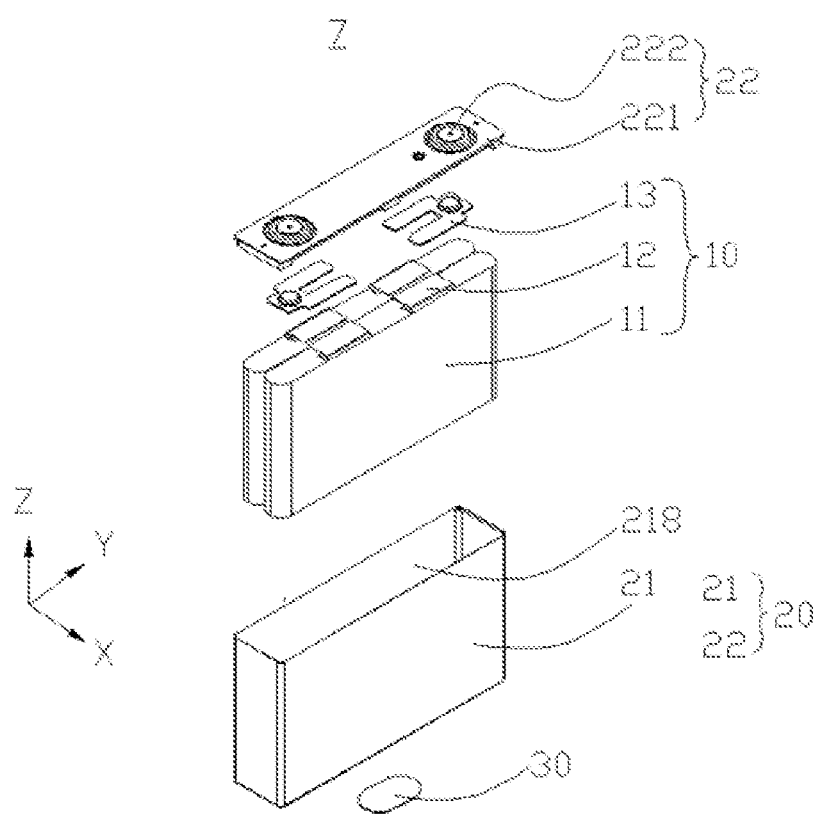
FIG. 4 is a schematic exploded view of a battery cell provided by some embodiments of the present application.

FIG. 4 is a schematic exploded view of a battery cell provided by some embodiments of the present application.

As shown in FIG. 4, a battery cell 7 provided by the embodiments of the present application includes an electrode assembly 10 and a housing assembly 20, and the electrode assembly 10 is accommodated in the housing assembly 20.

In some embodiments, the battery cell 7 includes an electrode assembly 10, a housing 21, a pressure relief mechanism 30 and a cover assembly 22. The housing 21 is provided with an accommodating space 218 for accommodating the electrode assembly 10; the housing 10 includes a first side plate 212 located on a side in a first direction Z; the pressure relief mechanism 30 is disposed on the first side plate 212; and the cover assembly 22 is configured for sealing the housing 21, where an inner surface 2120 of the first side plate 212 of the housing 21 is provided with a first flow channel extending along the inner surface 2120, and the first flow channel is configured to guide a gas in the accommodating space 218 to the pressure relief mechanism 30 so that the pressure relief mechanism 30 is actuated when a pressure reaches a threshold, and relieves the pressure.

In some embodiments, the housing assembly 20 may be further configured to accommodate an electrolyte, such as an electrolytic solution. The housing assembly 20 may be in a form of a variety of structures.

In some embodiments, the housing assembly 20 may include the housing 21 and the cover assembly 22. The housing 21 is a hollow structure with one side open. The cover assembly 22 covers an opening of the housing 21 and forms a sealed connection to form an accommodating cavity for accommodating the electrode assembly 10 and an electrolyte.

The housing 21 may have various shapes, such as a cylinder, a cube, or the like. The shape of the housing 21 may be determined according to a specific shape of the electrode assembly 10. For example, if the electrode assembly 10 has a cylindrical structure, a cylindrical housing may be selected; and if the electrode assembly 10 has a cuboid structure, a cuboid housing may be selected.

In some embodiments, the cover assembly 22 includes an end cover 221, and the end cover 221 covers an opening of the housing 21. The end cover 221 may have various structures, for example, the end cover 221 has a plate-shaped structure. Illustratively, in FIG. 4, the housing 21 has a cuboid structure, the end cover 221 has a plate-shaped structure, and the end cover 221 covers an opening at the top of the housing 21.

The end cover 221 may be made of an insulating material (such as plastic), or may be made of a conductive material (such as metal). When the end cover 221 is made of a metal material, the cover assembly 22 may further include an insulating plate located on a side of the end cover 221 facing the electrode assembly 10 to insulate and separate the end cover 221 from the electrode assembly 10.

In some embodiments, the cover assembly 22 may further include an electrode terminal 222 mounted on the end cover 221. There are two electrode terminals 222, and the two electrode terminals 222 are defined as a positive electrode terminal and a negative electrode terminal respectively. Both the positive electrode terminal and the negative electrode terminal are configured to be electrically connected to the electrode assembly 10 to output electric energy generated by the electrode assembly 10.

In some further embodiments, the housing assembly 20 may also have another structure. For example, the housing assembly 20 includes a housing 21 and two cover assemblies 22. The housing 21 is a hollow structure with an opening on two opposite sides. One cover assembly 22 correspondingly covers an opening of the housing 21 and forms a sealed connection to form an accommodating cavity for accommodating the electrode assembly 10 and the electrolyte. In this structure, one cover assembly 22 may be provided with two electrode terminals 222 while the other cover assembly 22 may not be provided with the electrode terminal 222, or each of the two cover assemblies 22 may be provided with one electrode terminal 222.

In the battery cell 7, the electrode assembly 10 accommodated in the housing assembly 20 may be one or plural. Illustratively, in FIG. 4, there are two electrode assemblies 10.

The electrode assembly 10 includes a positive electrode plate, a negative electrode plate and a separator. The electrode assembly 10 may be a winding electrode assembly, a laminated electrode assembly, or another form of electrode assembly.

In some embodiments, the electrode assembly 10 is a winding electrode assembly. A positive electrode plate, a negative electrode plate and a separator are all in a strip-shaped structure. In the embodiments of the present application, the positive electrode plate, the separator and the negative electrode plate can be stacked in sequence and wound for more than two turns to form the electrode assembly 10.

In some further embodiments, the electrode assembly 10 is a laminated electrode assembly. Specifically, the electrode assembly 10 includes a plurality of positive electrode plates and a plurality of negative electrode plates, the positive electrode plates and the negative electrode plates are alternately stacked, and a stacking direction is parallel to a thickness direction of the positive electrode plates and a thickness direction of the negative electrode plates.

From the perspective of the outer shape of the electrode assembly 10, the electrode assembly 10 includes a main body part 11 and a tab part 12 connected to the main body part 11. Illustratively, the tab part 12 extends from an end of the main body part 11 close to the cover assembly 22.

In some embodiments, there are two tab parts 12, and the two tab parts 12 are defined as a positive tab part and a negative tab part respectively. The positive tab part and the negative tab part may extend from the same end of the main body part 11, or may extend from opposite ends of the main body part 11 respectively.

The main body part 11 is a core portion of the electrode assembly 10 to realize a charging and discharging function, and the tab part 12 is configured to draw out current generated by the main body part 11. The main body part 11 includes a positive electrode current collecting part of a positive electrode current collector, a positive active substance layer, a negative electrode current collecting part of a negative electrode current collector, a negative active substance layer, and a separator. The positive tab part includes a plurality of positive tabs, and the negative tab part includes a plurality of negative tabs.

The tab part 12 is configured to be electrically connected to the electrode terminal 222. The tab part 12 may be directly connected to the electrode terminal 222 by means of welding for example, or may be indirectly connected to the electrode terminal 222 through another member. For example, the battery cell 7 further includes a current collecting member 13 for electrically connecting the electrode terminal 222 and the tab part 12. There are two current collecting members 13, and the two current collecting members 13 are defined as a positive electrode current collecting member and a negative electrode current collecting member respectively. The positive electrode current collecting member is configured to electrically connect the positive electrode terminal and the positive tab part, and the negative electrode current collecting member is configured to electrically connect the negative electrode terminal and the negative tab part. When the battery cell 7 is provided with a plurality of electrode assemblies 10, positive electrode current collecting members of the plurality of electrode assemblies 10 may be integrally configured, and negative electrode current collecting members of the plurality of electrode assemblies 10 may be integrally configured.

The first side plate 212 is located on a side of the housing assembly 20 in the first direction Z. The housing 21 of the housing assembly 20 has an end opening on the other side in the first direction Z opposite to the first side plate 212.

When the housing 21 is a hollow structure with one end open, the first side plate 212 is a bottom plate of the housing 21 located on a side of the electrode assembly 10 away from the cover assembly 22.

The pressure relief mechanism 30 is disposed on the first side plate 212. The pressure relief mechanism 30 may be a portion of the first side plate 212, or may be a separate structure from the first side plate 212. The first side plate 212 is provided with a first pressure relief hole 210 penetrating in a thickness direction of the first side plate 212, and the pressure relief mechanism 30 is fixed on the first side plate 212 by means of welding or the like and covers the first pressure relief hole 210. The pressure relief mechanism 30 seals the first pressure relief hole 210 to separate a space between inner and outer sides of the first side plate 212, which prevents an electrolyte from flowing out through the first pressure relief hole 210 during normal operation.

The pressure relief mechanism 30 is configured to be actuated when an internal pressure of the battery cell 7 reaches a threshold, to relieve the internal pressure. When a gas generated by the battery cell 7 is too much so that the internal pressure of the housing 21 rises and reaches the threshold, the pressure relief mechanism 30 performs an action or a weakened structure disposed in the pressure relief mechanism 30 is fractured, and the gas and other high temperature and high pressure substances are released to the outside through a fractured opening of the pressure relief mechanism 30 and the first pressure relief hole 210, thereby preventing the battery cell 7 from exploding.

The pressure relief mechanism 30 may have various possible pressure relief structures, which is not limited by the embodiments of the present application. For example, the pressure relief mechanism 30 may be a pressure-sensitive pressure relief mechanism configured to be fractured when an internal air pressure of the battery cell 7 provided with the pressure-sensitive pressure relief mechanism reaches a threshold.

In some embodiments, an indentation, a groove or another structure is formed on the pressure relief mechanism 30 to reduce local strength of the pressure relief mechanism 30 and form a weakened structure on the pressure relief mechanism 30. When an internal pressure of the battery cell 7 reaches a threshold, the pressure relief mechanism 30 is fractured at the weakened structure, and the pressure relief mechanism 30 is folded along a part provided at the fractured position and forms an opening so as to release high temperature and high pressure substances.

When short-circuit, overcharge and other phenomena occur, thermal runaway occurs in the battery cell 7 and a large amount of high temperature and high pressure substances such as a high temperature and high pressure gas are released. The first flow channel can guide the gas to flow, so as to guide the gas in the accommodating space 218 to the pressure relief mechanism 30, and the gas acts on a pressure bearing surface of the pressure relief mechanism 30 and applies pressure to the pressure relief mechanism 30. As the gas increases, the pressure the pressure relief mechanism 30 bears becomes greater, and the pressure relief mechanism 30 is actuated when the pressure reaches the threshold, to relieve the gas and other high temperature and high pressure substances to the outside of the battery cell 7, thereby releasing the internal pressure of the battery cell 7 to the outside, and preventing the battery cell 7 from exploding and catching fire.

In the embodiments of the present application, by setting the first flow channel on the first side plate 212 of the housing 21, the gas released by the battery cell 7 during thermal runaway can be guided from the accommodating space 218 to the pressure relief mechanism 30, so that the pressure relief mechanism 30 is actuated in time and relieves the gas, so as to increase an exhaust rate during the thermal runaway of the battery cell 7, and improve safety of the battery cell 7.

Figure 5:
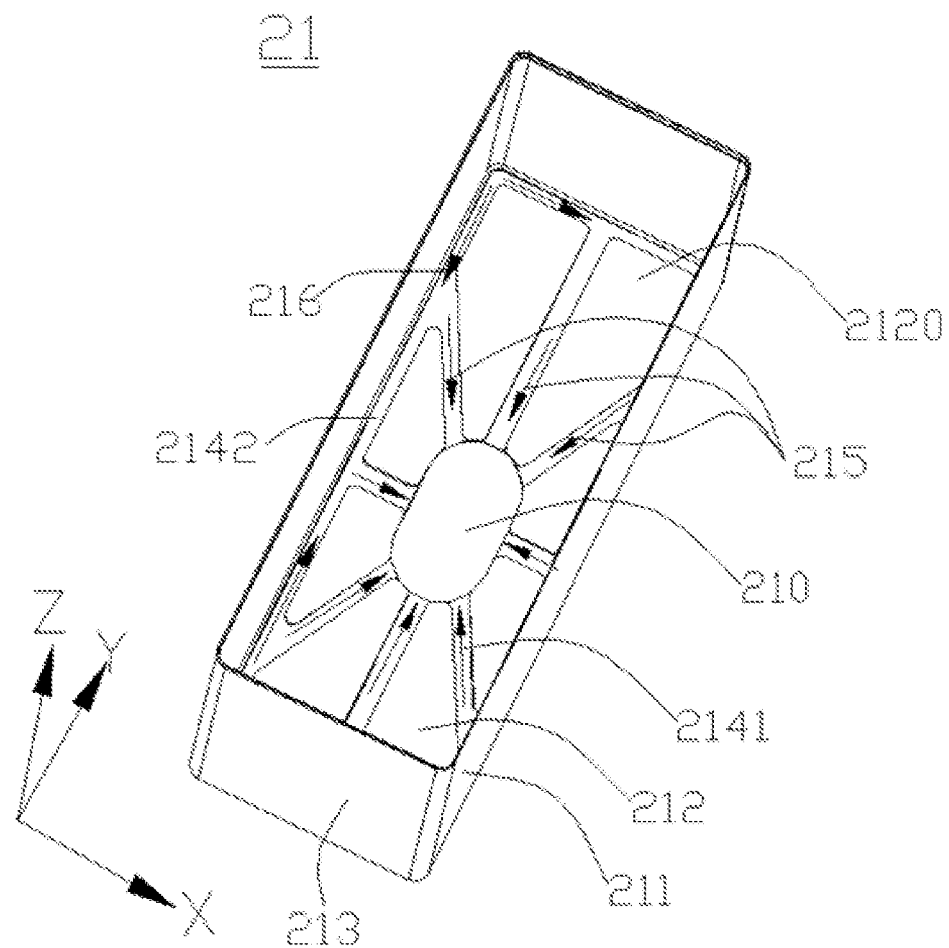
FIG. 5 is a schematic structural diagram of a housing of a battery cell provided by some embodiments of the present application.
Figure 6:
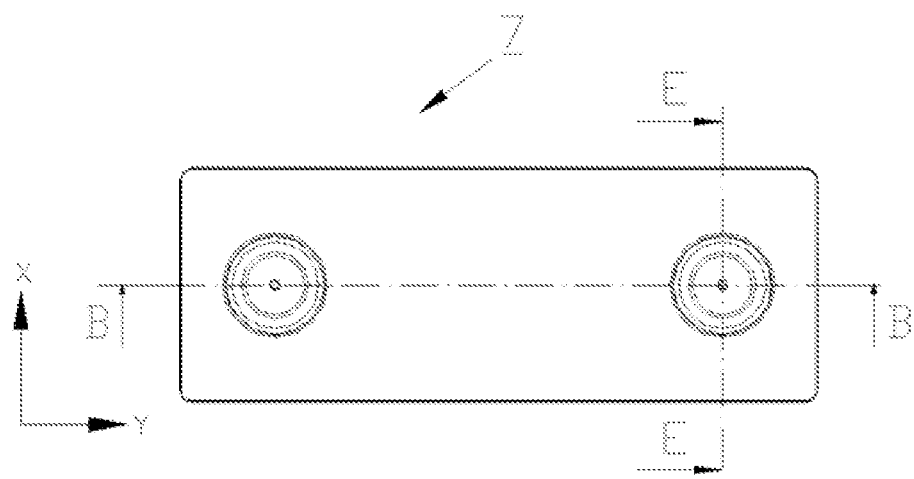
FIG. 6 is a schematic top view of a battery cell provided by some embodiments of the present application.
Figure 7:
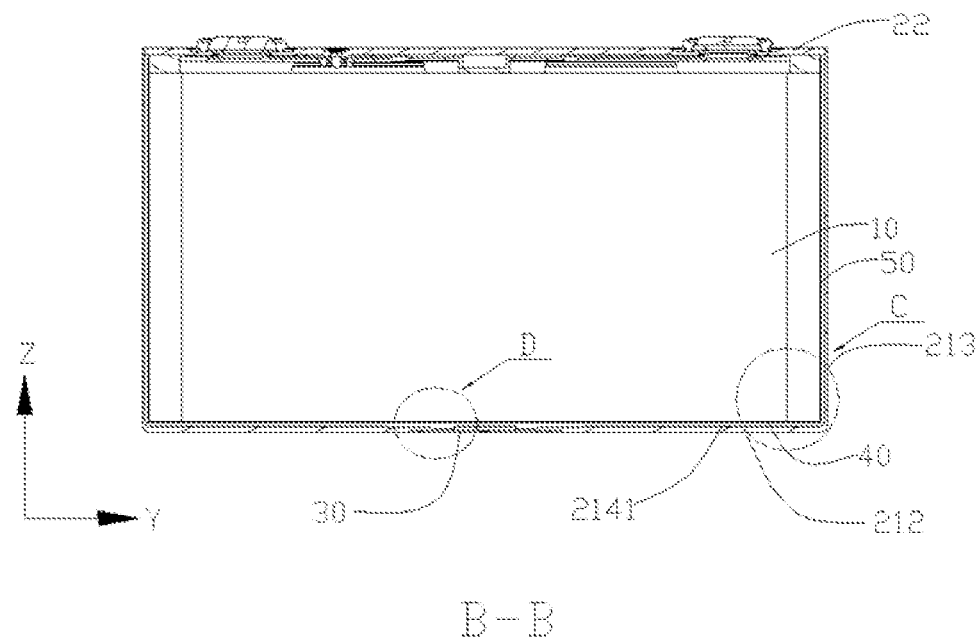
FIG. 7 is a schematic cross-sectional view of the battery cell shown in FIG. 6 using the housing of the embodiment of FIG. 5 at B-B.
Figure 8:
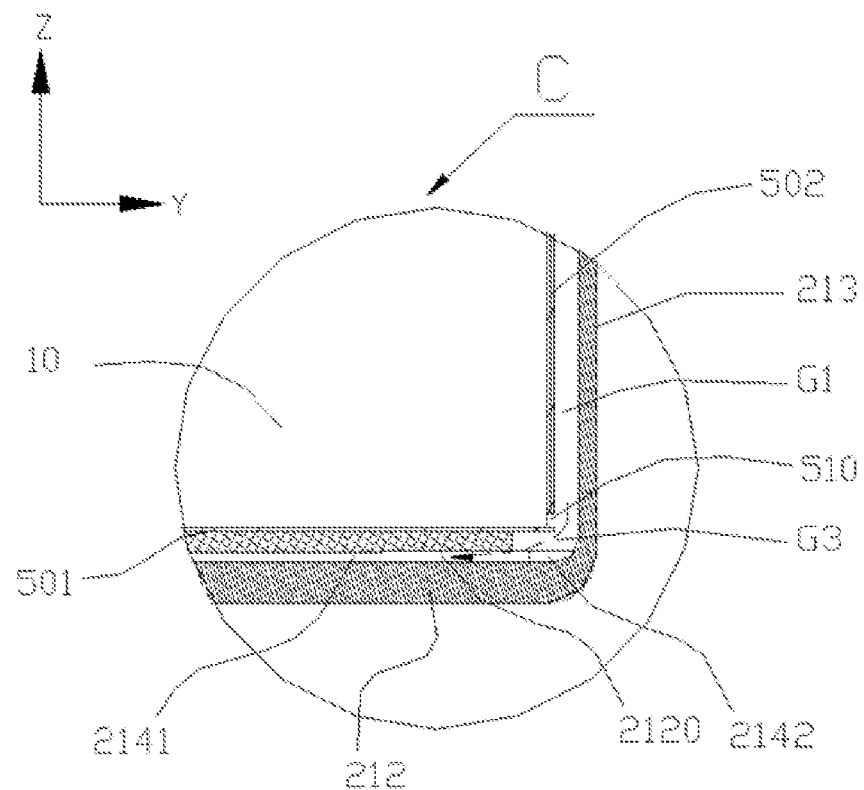
FIG. 8 is a schematic enlarged view of the battery cell shown in FIG. 7 at C.
Figure 9:
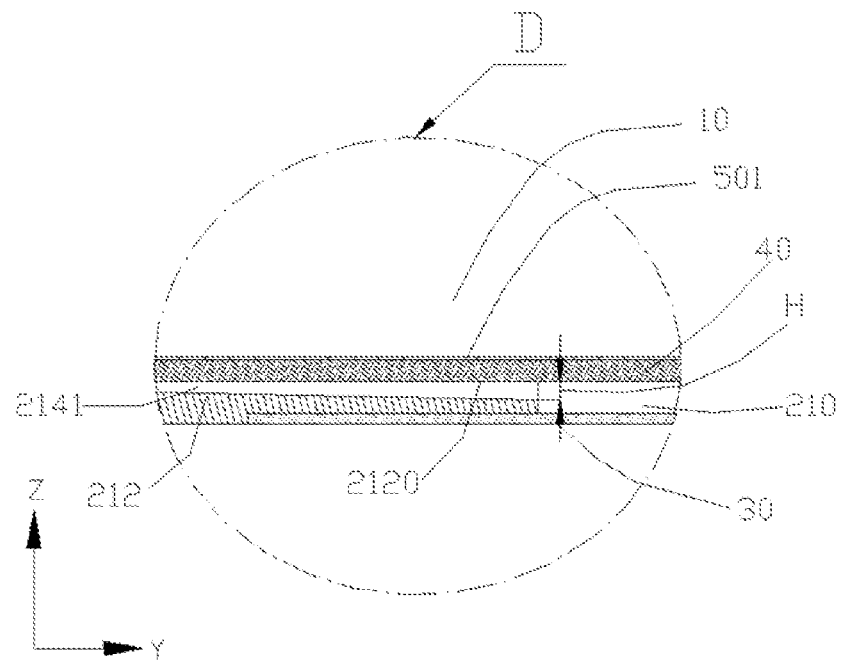
FIG. 9 is a schematic enlarged view of the battery cell shown in FIG. 7 at D.
Figure 10:
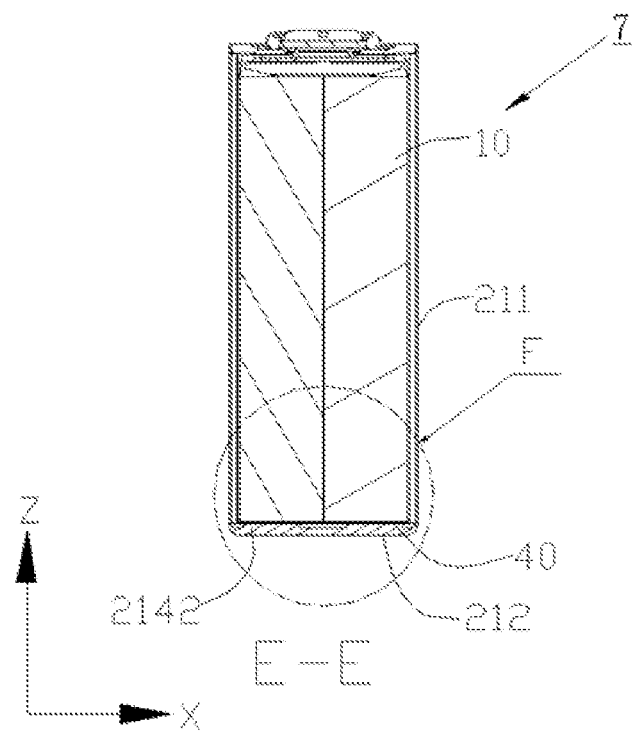
FIG. 10 is a schematic cross-sectional view of the battery cell shown in FIG. 6 using the housing of the embodiment of FIG. 5 at E-E.
Figure 11:
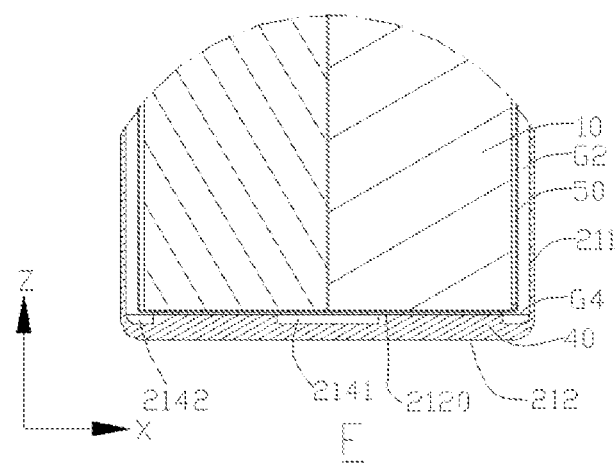
FIG. 11 is a schematic enlarged view of the battery cell shown in FIG. 10 at F.

FIG. 5 is a schematic structural diagram of a housing of a battery cell provided by some embodiments of the present application; FIG. 6 is a schematic top view of a battery cell provided by some embodiments of the present application; FIG. 7 is a schematic cross-sectional view of the battery cell shown in FIG. 6 using the housing of the embodiment of FIG. 5 at B-B; FIG. 8 is a schematic enlarged view of the battery cell shown in FIG. 7 at C; FIG. 9 is a schematic enlarged view of the battery cell shown in FIG. 7 at D; FIG. 10 is a schematic cross-sectional view of the battery cell shown in FIG. 6 using the housing of the embodiment of FIG. 5 at E-E; and FIG. 11 is a schematic enlarged view of the battery cell shown in FIG. 10 at F.

Referring to FIGS. 5 to 11, in some embodiments, the first flow channel includes a first intermediate flow channel 215 and a first edge flow channel 216, the first edge flow channel 216 extends along a circumferential edge of the inner surface 2120 of the first side plate 212 and communicates with the accommodating space 218, and the first edge flow channel 216 and a pressure relief mechanism 30 are in communication through the first intermediate flow channel 215.

In some embodiments, the first intermediate flow channel 215 includes a first intermediate groove 2141 extending on the inner surface 2120, one end of each first intermediate groove 2141 communicates with the pressure relief mechanism 30, and the other end of each first intermediate groove 2141 communicates with the first edge flow channel 216. When thermal runaway occurs in the battery cell 7, the released gas can be guided from the accommodating space 218 to the pressure relief mechanism 30 along the first intermediate groove 2141 to be discharged, which will not affect gas exhausting due to blockage of the electrode assembly 10, increases an exhaust rate during the thermal runaway of the battery cell 7, and improves safety of the battery cell 7. At the same time, the first intermediate groove 2141 is disposed on the inner surface 2120 of the first side plate 212 so as not to occupy the accommodating space 218 and thus energy density of the battery cell 7 is not affected.

In some embodiments, the first intermediate flow channel 215 includes a plurality of the first intermediate grooves 2141, and each of the first intermediate grooves 2141 communicates with the pressure relief mechanism 30 and the first edge flow channel 216. The plurality of first intermediate grooves 2141 can improve the exhaust rate during the thermal runaway of the battery cell 7, and improve the safety of the battery cell 7. At the same time, even if a certain one of the first intermediate grooves 2141 is blocked, the gas can also move to another first intermediate groove 2141 through the first edge flow channel 216 and then be discharged by the pressure relief mechanism 30, which improves reliability of gas exhausting. Furthermore, the first intermediate groove 2141 is disposed on the inner surface of the first side plate 212 so as not to occupy the accommodating space 218 and thus energy density of the battery cell 7 is not affected.

In some embodiments, the plurality of first intermediate grooves 2141 on the housing 21 extend to a periphery in a divergent shape with the pressure relief mechanism 30 as a center.

Specifically, the plurality of first intermediate grooves 2141 together form the first intermediate flow channel 215, and the plurality of first intermediate grooves 2141 extend to the periphery in the divergent shape with the pressure relief mechanism 30 as the center. Extending in the divergent shape means that the plurality of first intermediate grooves 2141 are centered on the pressure relief mechanism 30, and the plurality of first intermediate grooves 2141 extend approximately in a radial direction with a center of the pressure relief mechanism 30 as an axis. Ends of the plurality of first intermediate grooves 2141 communicate with the pressure relief mechanism 30. In some embodiments, the plurality of first intermediate grooves 2141 are connected to the first pressure relief hole 210. The other ends of a portion of the first intermediate grooves 2141 extend to the vicinity of an adjacent second side plate 213, and the other ends of a portion of the first intermediate grooves 2141 extend to the vicinity of a third side plate 211.

In some embodiments, the first edge flow channel 216 includes a first edge groove 2142 disposed at a circumferential edge of the inner surface 2120 of the first side plate 212 and extending along the circumferential edge, and each of the first intermediate grooves 2141 communicates with the first edge groove 2142. By setting the first edge groove 2142, the gas can move to the nearest first intermediate groove 2141 through the first edge groove 2142 and be guided to the pressure relief mechanism 30 to be discharged, which shortens a movement path of the gas, makes gas exhausting smoother, and improves exhaust efficiency. In addition, if a certain first intermediate groove 2141 is blocked, the gas can also move to another first intermediate groove 2141 through the first edge groove 2142 to be discharged, which improves the reliability of gas exhausting. In some embodiments, the first edge groove 2142 is an integrally communicated annulus.

Referring to FIG. 5, the housing 21 includes a pair of second side plates 213 disposed opposite to each other in a third direction Y, and a pair of third side plates 211 disposed opposite to each other in a second direction X. Both the second side plates 213 and the third side plates 211 are connected to the first side plate 212, and the second side plates 213 and the third side plates 211 adjacent to each other are also connected together to form the accommodating space 218. The second direction X is perpendicular to the first direction Z and the third direction Y. The third direction Y is perpendicular to the first direction Z and the second direction X.

Referring to FIG. 8, in the embodiment, the accommodating space 218 includes a first gap G1 disposed between the electrode assembly 10 and each of the second side plates 213, and a portion of the first edge grooves 2142 extending to the vicinity of the adjacent second side plate 213 communicate with the first gap G1. The accommodating space 218 further includes a second gap G2 disposed between the electrode assembly 10 and each of the third side plates 213, and a portion of the first edge grooves 2142 extending to the vicinity of the third side plate 213 communicate with the second gap G2. In this way, when thermal runaway occurs in the battery cell 7, the gas can be guided to the first intermediate groove 2141 along the first edge groove 2142 through the first gap G1 and the second gap G2 respectively in the circumferential direction of the first side plate 212, and then move to the pressure relief mechanism 30 through the first intermediate groove 2141. In addition, the gas generated inside the electrode assembly 10 can also enter the pressure relief mechanism 30 directly through the first intermediate groove 2141, which increases the exhaust rate during the thermal runaway of the battery cell 7, and improves the safety of the battery cell 7.

Referring to FIG. 8, the accommodating space 218 includes a first gap G1 disposed between the electrode assembly 10 and each of the second side plates 213. The first edge groove 2142 communicates with the first gap G1. The first intermediate groove 2141 communicates with the first gap G1 through the first edge groove 2142, thereby realizing communication between the first intermediate flow channel 215 and the accommodating space 218 through the first edge flow channel 216.

Referring to FIG. 9, in some embodiments, starting from a position where the first intermediate flow channel 215 communicates with the pressure relief mechanism 30, a depth H of at least a portion of a length of the first intermediate flow channel 215 gradually decreases in a direction away from the pressure relief mechanism 30.

Specifically, starting from the position where the first intermediate flow channel 215 communicates with the pressure relief mechanism 30, in at least the portion of the length of each first intermediate groove 2141 constituting the first intermediate flow channel 215 in the third direction Y, the depth H of the first intermediate groove 2141 gradually decreases in the direction away from the pressure relief mechanism 30. Referring to FIG. 9, a depth H of at least a portion of a length of the first intermediate groove 2141 gradually increases in a direction close to the pressure relief mechanism 30, so as to form a slope inclined toward the gas exhausting direction of the pressure relief mechanism 30, which is more beneficial to guide the gas to the pressure relief mechanism 30 to be discharged, and improves exhaust efficiency. The slope may be inclined in a straight line or in an arc.

The portion of the length means that the portion where the depth H changes only occupies a portion of the length of the first intermediate flow channel 215 that is connected to the pressure relief mechanism 20 in the third direction Y, and a depth of the remaining portion of the length of the first intermediate flow channel 215 can remain unchanged. In some further embodiments, the first intermediate flow channel 215 may also have a change in the depth H over the entire length of the first intermediate flow channel 215.

The position where the first intermediate flow channel 215 communicates with the pressure relief mechanism 30 refers to a position where the first intermediate flow channel 215 is connected to an edge of the pressure relief mechanism 30. When the housing 21 is provided with a first pressure relief hole 210, the position where the first intermediate flow channel 215 communicates with the pressure relief mechanism 30 refers to a position where the first intermediate flow channel 215 is connected to the first pressure relief hole 210.

Referring to FIGS. 10 and 11, a second gap G2 is disposed between the electrode assembly 10 and each of the third side plates 211, and the first edge groove 2142 communicates with the second gap G2. The first intermediate groove 2141 communicates with the second gap G2 through the first edge groove 2142, thereby realizing communication between the first intermediate flow channel 215 and the accommodating space 218 through the first edge flow channel 216. Furthermore, when a gas generated by the battery cell 7 is too much so that the internal pressure of the housing 21 rises and reaches a threshold, after the gas passes through the second gap G2, it can move to the pressure relief mechanism 30 through the plurality of first intermediate grooves 2141 to be discharged without being blocked by the electrode assembly 10.

In addition, in some embodiments, the gas generated inside the electrode assembly 10 can also enter the pressure relief mechanism 30 directly through the first intermediate flow channel 215.

Figure 12:
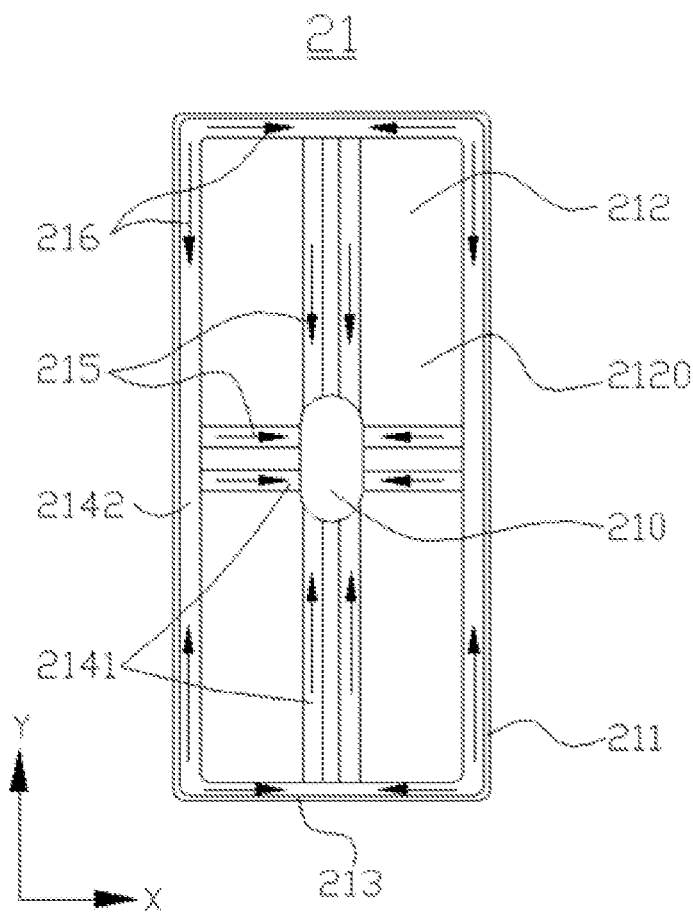
FIG. 12 is a schematic structural diagram of a housing of a battery cell provided by another embodiment of the present application.

FIG. 12 is a schematic structural diagram of a housing of a battery cell provided by another embodiment of the present application.

Referring to FIG. 12, in this embodiment, difference from the housing 21 in the embodiment of FIG. 5 lies in that the plurality of first intermediate grooves 2141 constituting the first intermediate flow channel 215 include at least two first intermediate grooves 2141 parallel to each other. As shown in FIG. 12, the first intermediate flow channel 215 includes two first intermediate grooves 2141 extending in the third direction Y and two first intermediate grooves 2141 extending in the second direction X. Each of the first intermediate grooves 2141 communicates with the pressure relief mechanism 30 and the first edge groove 2142. The number of the first intermediate grooves 2141 is not limited to two, and the extending direction thereof is also not limited to the third direction Y or the second direction X.

Figure 13:
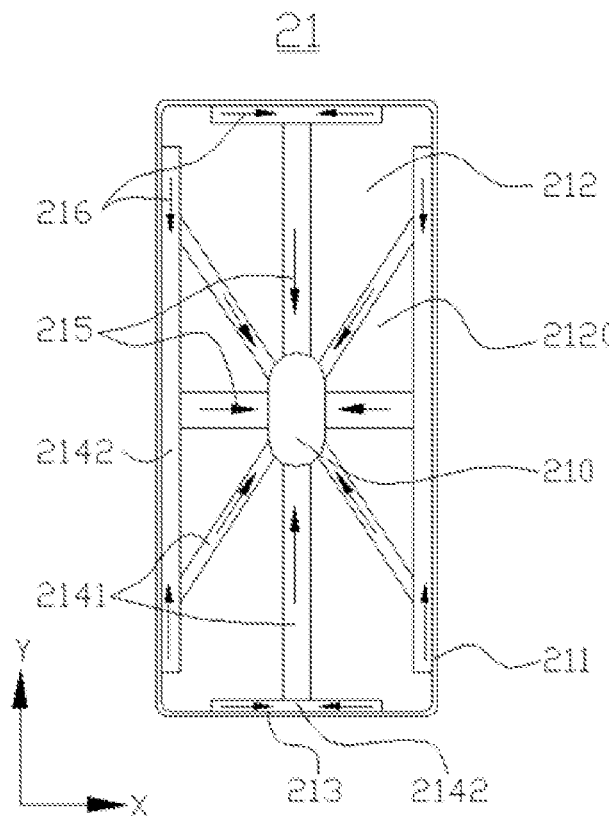
FIG. 13 is a schematic structural diagram of a housing of a battery cell provided by another embodiment of the present application.

FIG. 13 is a schematic structural diagram of a housing of a battery cell provided by another embodiment of the present application.

Referring to FIG. 13, in this embodiment, difference from the housing 21 in the embodiment of FIG. 5 lies in that the first edge groove 2142 is not continuously disposed, but is a notched annulus, or the first edge groove 2142 includes a plurality of sub-grooves spaced apart along the circumferential edge, and each sub-groove communicates with the pressure relief mechanism 30 through the first intermediate groove 2141.

Figure 14:
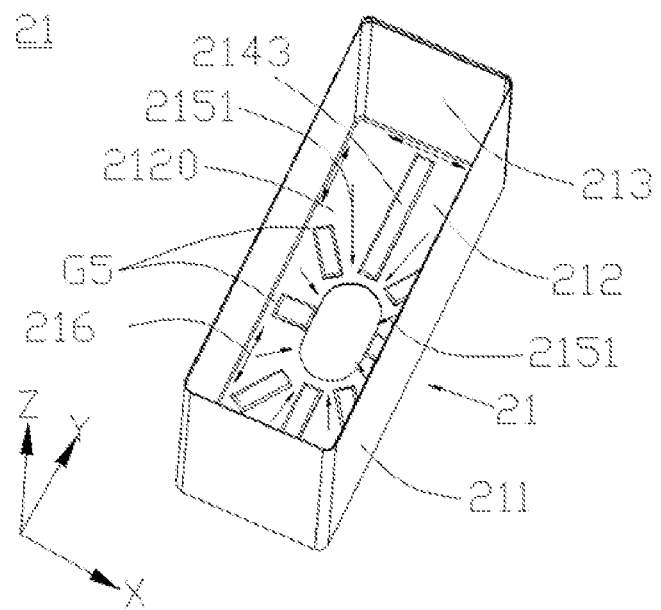
FIG. 14 is a schematic structural diagram of a housing of a battery cell provided by another embodiment of the present application.
Figure 15:
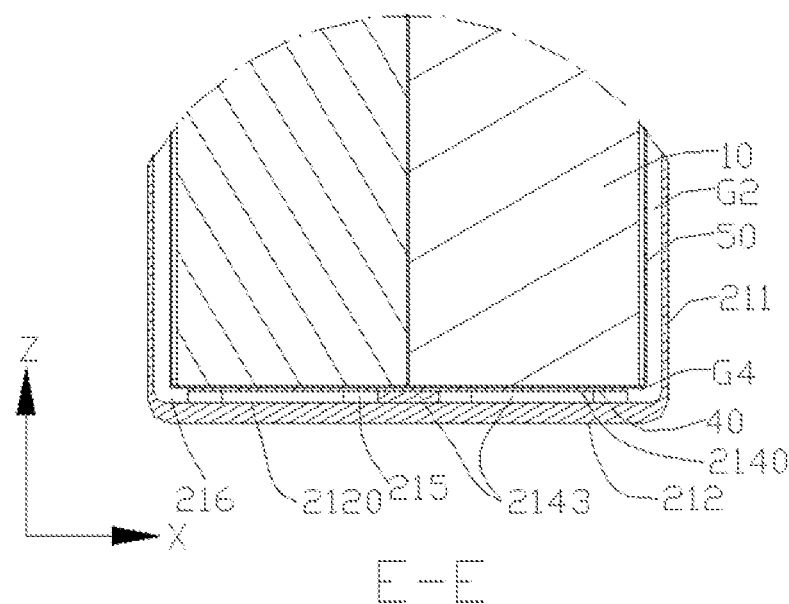
FIG. 15 is a schematic partially enlarged view of a schematic cross-sectional view of the battery cell shown in FIG. 6 using the housing of the embodiment of FIG. 14 at E-E.

FIG. 14 is a schematic structural diagram of a housing of a battery cell provided by another embodiment of the present application; and FIG. 15 is a schematic partially enlarged view of a schematic cross-sectional view of the battery cell shown in FIG. 6 using the housing of the embodiment of FIG. 14 at E-E.

Referring to FIGS. 14 and 15, in some embodiments, in the housing 21, a first protruding part 2143 protruding toward the accommodating space 218 is formed on the inner surface of the first side plate 212, the first protruding part 2143 has a top surface 2140 away from the inner surface 2120, and the first intermediate flow channel 215 and the first edge flow channel 216 are formed in a space between the top surface 2140 of the first protruding part 2143 and the inner surface 2120. In this embodiment, the top surface 2140 of the first protruding part 2143 is used to support the electrode assembly 10, and the first intermediate flow channel 215 and the first edge flow channel 216 are formed in the space between the top surface 2140 of the first protruding part 2143 and the inner surface 2120, which can increase the exhaust rate during the thermal runaway of the battery cell 7, and improves the safety of the battery cell 7.

In some embodiments, as shown in FIG. 14, the first intermediate flow channel 215 includes a plurality of first intermediate sub-flow channels 2151 communicating with the pressure relief mechanism 30; there are a plurality of the first protruding parts 2143, the plurality of first protruding parts 2143 extend to a periphery in a divergent shape with the pressure relief mechanism 30 as a center and are spaced apart from each other, and one of the first intermediate sub-flow channels 2151 is formed between two adjacent first protruding parts 2143 and the inner surface 2120. A fifth gap G5 is disposed between an end of each of the first protruding parts 2143 away from the pressure relief mechanism 30 and an adjacent second side plate 213 or an adjacent third side plate 211, and the fifth gap G5 forms a portion of the first edge flow channel 216. By setting the plurality of first protruding parts 2143 that extend to the periphery in the divergent shape with the pressure relief mechanism 30 as the center, the first intermediate flow channel 215 and the first edge flow channel 216 are formed, which can improve exhaust efficiency in the circumferential direction of the pressure relief mechanism 30. By setting the fifth gap G5, the gas can also move along a circumferential direction of an edge of the first side plate 212 to form the first edge flow channel 216. In addition, if a certain one of the first intermediate sub-flow channels 2151 is blocked, the gas can also move to another first intermediate sub-flow channel 2151 through the first edge flow channel 216 to be discharged, which improves the reliability of gas exhausting.

Specifically, one of the first intermediate sub-flow channels 2151 is formed between two adjacent first protruding parts 2143 and the inner surface 2120, and the plurality of first intermediate sub-flow channels 2151 extend to the periphery in the divergent shape with the pressure relief mechanism 30 as the center and are spaced apart from each other. Extending in the divergent shape means that the plurality of first intermediate sub-flow channels 2151 are centered on the pressure relief mechanism 30, and the plurality of first intermediate sub-flow channels 2151 extend approximately in a radial direction with a center point of the pressure relief mechanism 30 as an axis. Ends of the plurality of first intermediate sub-flow channels 2151 communicate with the pressure relief mechanism 30. In some embodiments, the plurality of first intermediate sub-flow channels 2151 are connected to the first pressure relief hole 210. The other ends of a portion of the first intermediate sub-flow channels 2151 extend to the vicinity of one second side plate 213 and communicate with the first gap G1, and the other ends of a portion of the first intermediate sub-flow channels 2151 extend to the vicinity of one third side plate 211 and communicate with the second gap G2. The adjacent first intermediate sub-flow channels 2151 can also communicate with each other through the fifth gap G5.

Referring to FIGS. 8 and 11, in this embodiment, the accommodating space 218 includes the first gap G1 disposed between the electrode assembly 10 and each of the second side plates 213, and a portion of the first intermediate flow sub-channels 2151 extending to the vicinity of one second side plate 213 communicate with the first gap G1. The accommodating space 218 further includes the second gap G2 disposed between the electrode assembly 10 and each of the third side plates 211, and a portion of the first intermediate sub-flow channels 2151 extending to the vicinity of one third side plate 213 communicate with the second gap G2. In this way, when thermal runaway occurs in the battery cell 7, the gas can be guided to the pressure relief mechanism 30 along the first intermediate flow channel 215 in the circumferential direction of the pressure relief mechanism 30, so as to improve the exhaust efficiency during the thermal runaway of the battery cell 7, and improve the safety of the battery cell 7. In addition, if a certain one of the first intermediate sub-flow channels 2151 is blocked, the gas can also move to another first intermediate sub-flow channel 2151 through the first edge flow channel 216 to be discharged, which improves the reliability of gas exhausting.

In addition, in some embodiments, the gas generated inside the electrode assembly 10 can also enter the pressure relief mechanism 30 directly through the first intermediate sub-flow channel 2151.

In addition, in the embodiments of FIGS. 12 to 14, or referring to the embodiment of FIG. 9, starting from a position where the first intermediate flow channel 215 communicates with the pressure relief mechanism 30, a depth H of at least a portion of a length of the first intermediate flow channel 215 gradually decreases in a direction away from the pressure relief mechanism 30.

In the above embodiments, an insulating layer may also be disposed on the top surface 2140 of the first protruding part 2143, the insulating layer is configured to realize insulation between the electrode assembly 10 and the housing 21, and there is no need to provide an additional support member, which reduces occupation of the accommodating space 218, and is beneficial to improve energy density of the battery cell 7 without affecting the gas exhausting of the battery cell 7.

Figure 16:
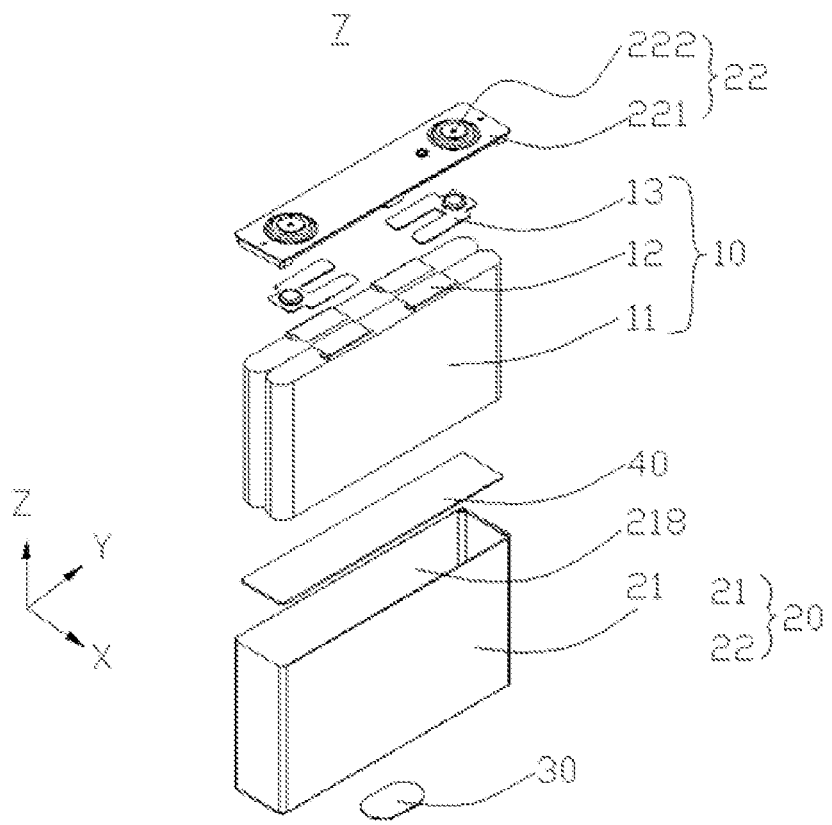
FIG. 16 is a schematic structural diagram of a battery cell provided with a support member provided by another embodiment of the present application.

FIG. 16 is a schematic structural diagram of a battery cell provided by another embodiment of the present application.

Referring to FIG. 16, this embodiment differs from the above embodiments in that a support member 40 is added. The support member 40 is disposed between the electrode assembly 10 and the first side plate 212 and configured to support the electrode assembly 10. The electrode assembly 10, the support member 40 and the first side plate 212 are arranged in order in the first direction Z. Illustratively, the support member 40 is made of an insulating material capable of insulating the first side plate 212 from the electrode assembly 10. The support member 40 can support the electrode assembly 10 to reduce shaking of the electrode assembly 10 when the battery cell 7 vibrates, and reduce the risk of falling off of active substances of the electrode assembly 10.

The support member 40 may directly abut against the electrode assembly 10 to support the electrode assembly 10, or may support the electrode assembly 10 through another member. For example, the battery cell 7 further includes an insulating film 50 coating an outer side of the main body part 11 of the electrode assembly 10, a portion of the insulating film 50 is located between the support member 40 and the electrode assembly 10, and the support member 40 supports the electrode assembly 10 through the insulating film 50. The support member 40 has a first surface 41 and a second surface 42 disposed opposite to each other, the first surface 41 faces the first side plate 2120, and the second surface 42 faces the electrode assembly 10.

In some embodiments, the support member 40 may abut against the first side plate 212, for example, in the embodiments of FIGS. 5-11, the support member 40 may abut against the first side plate 212 under the gravity of the electrode assembly 10, and is in contact with the inner surface 2120 of the first side plate 212. Referring to FIG. 8, a third gap G3 is disposed between the support member 40 and the third side plate 213 in the third direction Y, and referring to the embodiment in FIG. 11, a fourth gap G4 is disposed between the support member 40 and the adjacent second side plate 211 in the second direction X. The first gap G1 communicates with the first edge flow channel 216 through the third gap G3. The second gap G2 communicates with the first edge flow channel 216 through the fourth gap G4.

The support member 40 may also be spaced apart from the first side plate 212 in the first direction Z. For example, in the embodiments of FIGS. 14 and 15, the support member 40 may be placed on the surface of the first protruding part 2143 and spaced apart from the inner surface 2120 of the first side plate 212.

Figure 17:
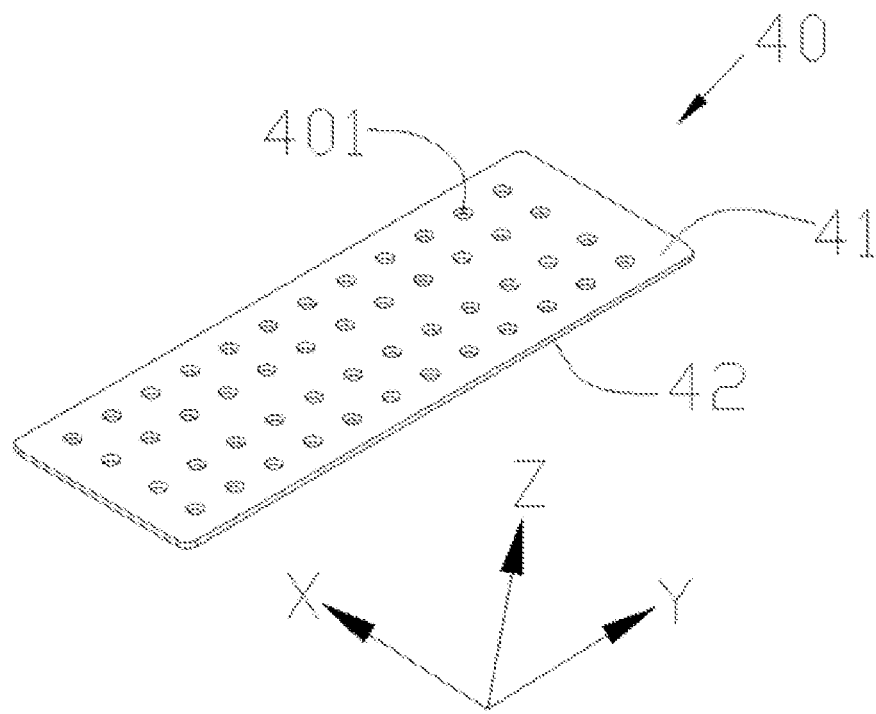
FIG. 17 is a schematic structural diagram of a support member of a battery cell provided by another embodiment of the present application.
Figure 18:
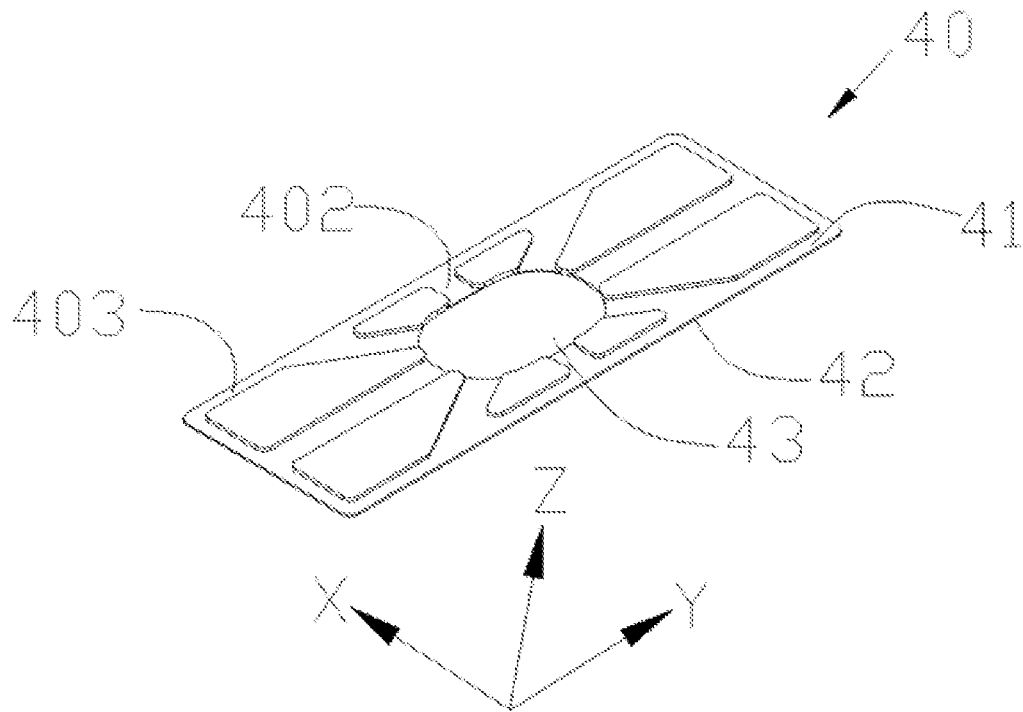
FIG. 18 is a schematic structural diagram of a support member of a battery cell provided by another embodiment of the present application.
Figure 19:
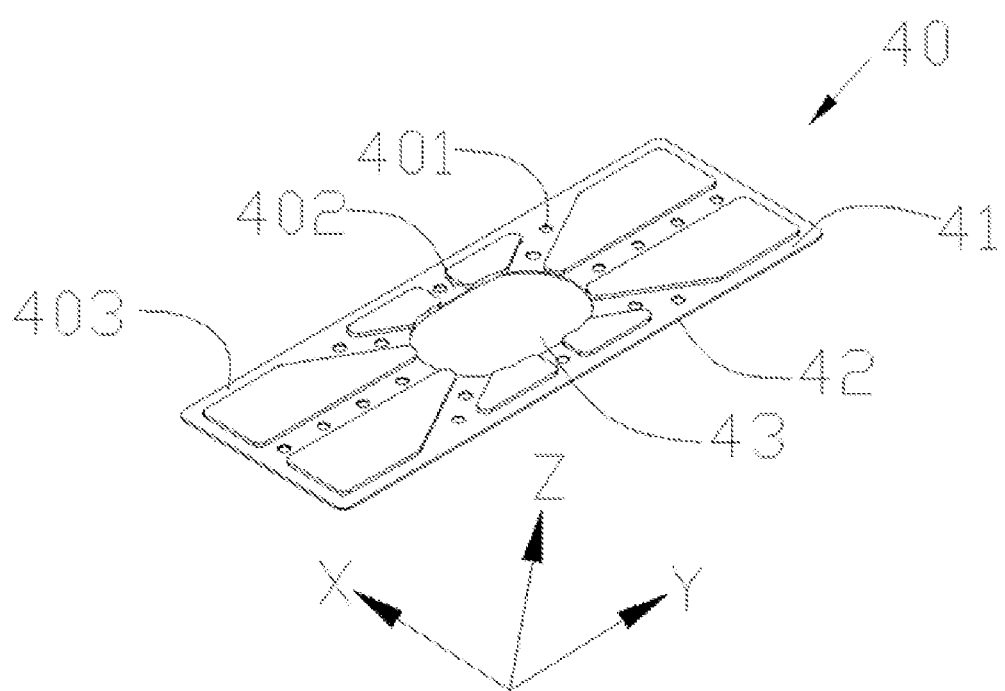
FIG. 19 is a schematic structural diagram of a support member of a battery cell provided by another embodiment of the present application.

FIG. 17 is a schematic structural diagram of a support member of a battery cell provided by another embodiment of the present application; FIG. 18 is a schematic structural diagram of a support member of a battery cell provided by another embodiment of the present application; and FIG. 19 is a schematic structural diagram of a support member of a battery cell provided by another embodiment of the present application.

In some embodiments, a second flow channel is disposed on the support member 40, and the first intermediate flow channel 215 and the accommodating space 218 are in communication through the second flow channel. The second flow channel is formed on the support member 40 so that the first intermediate flow channel 215 and the accommodating space 218 are in communication, which can increase a flow channel area of gas exhausting, and improve exhaust efficiency.

Referring to FIG. 17, in some embodiments, the second flow channel includes a first through hole 401 penetrating the support member 40 in the first direction Z, and the first intermediate flow channel 215 and the accommodating space 218 are in communication through the first through hole 401 in the first direction Z. By means of the first through hole 401, the gas generated inside the electrode assembly 10 can pass through the support member 40 through the first through hole 401 and enter the first intermediate flow channel 215 directly, which can improve exhaust efficiency.

Referring to FIG. 18, in some embodiments, the second flow channel matches the first flow channel in shape. The shape of the second flow channel matches the shape of the first flow channel, and after combination, a cross-sectional area of the flow channel of gas exhausting can be increased, and exhaust efficiency can be improved. Specifically, the shape of the second flow channel matches shapes of the first intermediate flow channel 215 and the first edge flow channel 216, and after the combination, the cross-sectional area of the flow channel of gas exhausting can be increased, and the exhaust efficiency can be improved.

In some embodiments, the second flow channel includes a second intermediate flow channel 402 disposed on the first surface 41, the second intermediate flow channel 402 communicates with the first gap G1 and/or the second gap G2, and the second intermediate flow channel 402 has the same shape as the first intermediate flow channel 215. The support member 40 is provided with the second intermediate flow channel 402 communicating with the first gap G1 and/or the second gap G2 and the first intermediate flow channel 215, so that the flow channel area of gas exhausting can be increased and the exhaust efficiency can be improved.

In some embodiments, a second pressure relief hole 43 is disposed on the support member 40, and a position of the second pressure relief hole 43 corresponds to that of the first pressure relief hole 210 on the housing 21. The second intermediate flow channel 402 extends to a periphery in a divergent shape with the second pressure relief hole 43 as a center. The second pressure relief hole 43 and the first gap G1 and/or the second gap G2 are in communication through the second intermediate flow channel 402.

In some embodiments, a peripheral edge of the support member 40 is further provided with a second edge flow channel 403, and a shape of the second edge flow channel 403 is the same as that of the first edge flow channel 216. The flow channel area of gas exhausting at the edge of the first side plate 212 can be increased, and the exhaust efficiency can be improved.

Referring to FIG. 19, in some embodiments, the first through hole 401, the second intermediate flow channel 402 and the second edge flow channel 403 are disposed on the support member 40, and the first through hole 401 communicates with the second intermediate flow channel 402. The flow channel area of gas exhausting can be further increased and the exhaust efficiency is improved.

Figure 20:
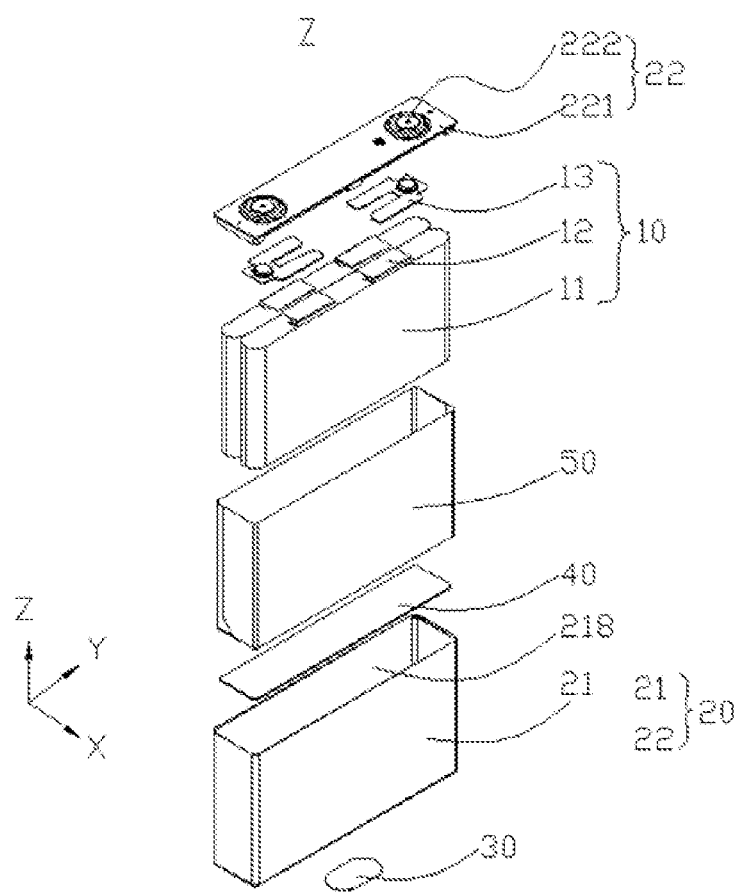
FIG. 20 is a schematic structural diagram of a battery cell provided with a support member and an insulating film provided by another embodiment of the present application.
Figure 21:
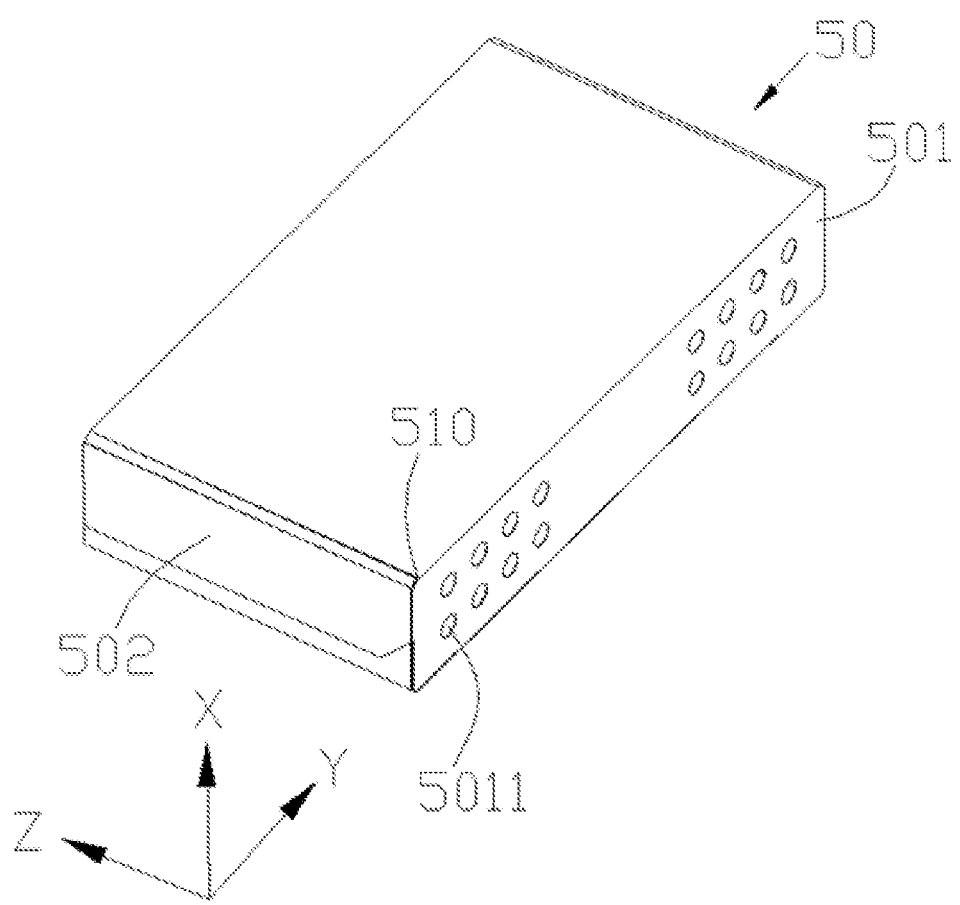
FIG. 21 is a schematic structural diagram of an insulating film shown by another embodiment of the present application.

FIG. 20 is a schematic structural diagram of a battery cell provided with a support member and an insulating film provided by another embodiment of the present application; and FIG. 21 is a schematic structural diagram of an insulating film shown by another embodiment of the present application.

Referring to FIGS. 20 to 21, in some embodiments, the battery cell 7 further includes an insulating film 50 coating an outer side of the main body part 11 of the electrode assembly 10, a portion of the insulating film 50 is located between the support member 40 and the electrode assembly 10, and the support member 40 supports the electrode assembly 10 through the insulating film 50. The support member 40 has a first surface 41 and a second surface 42 disposed opposite to each other, the first surface 41 faces the first side plate 2120, and the second surface 42 faces the insulating film 50.

In some embodiments, the insulating film 50 is configured to wrap a portion of the electrode assembly 10 and separate the electrode assembly 10 and the housing 21; the insulating film 50 includes a first side film 501 located between the electrode assembly 10 and the support member 40; and the first side film 501 has a second through hole 5011, and a projection of the second through hole 5011 does not overlap with projections of the first through hole 401 and the second pressure relief hole 43 of the support member 40 on the first direction Z. The projection of the second through hole 5011 of the first side film 501 of the insulating film 50 does not overlap with the projections of the first through hole 401 and the second pressure relief hole 43 on the support member 40 in the first direction Z, which can avoid that the electrode assembly 10 and the first side plate 212 of the housing 21 are in direct contact, and realize communication between the accommodating space 218 and the first intermediate flow channel 215 through the first through hole 401 and the second through hole 5011 while achieving reliable insulation between the electrode assembly 10 and the first side plate 212. Therefore, exhaust efficiency is improved.

In some embodiments, referring to FIG. 21 and FIG. 8, the first side film 501 is located on one side of the insulating film 50 in the first direction Z. The insulating film 50 is provided with third side films 502 disposed opposite to each other in the third direction Y, and an opening 510 is disposed at a position of the third side film 502 close to the first side film 501. The gas generated in the electrode assembly 10 wrapped by the insulating film 50 can be connected to the first intermediate flow channel 215 through the second through hole 5011 and the first through hole 402 on one hand, and can be connected to the first edge flow channel 216 through the opening 510 as well as the first gap G1 and the third gap G3 on the other hand, and further be discharged through the pressure relief mechanism 30, which can increase the flow channel area of gas exhausting and improve the exhaust efficiency.

Figure 22:
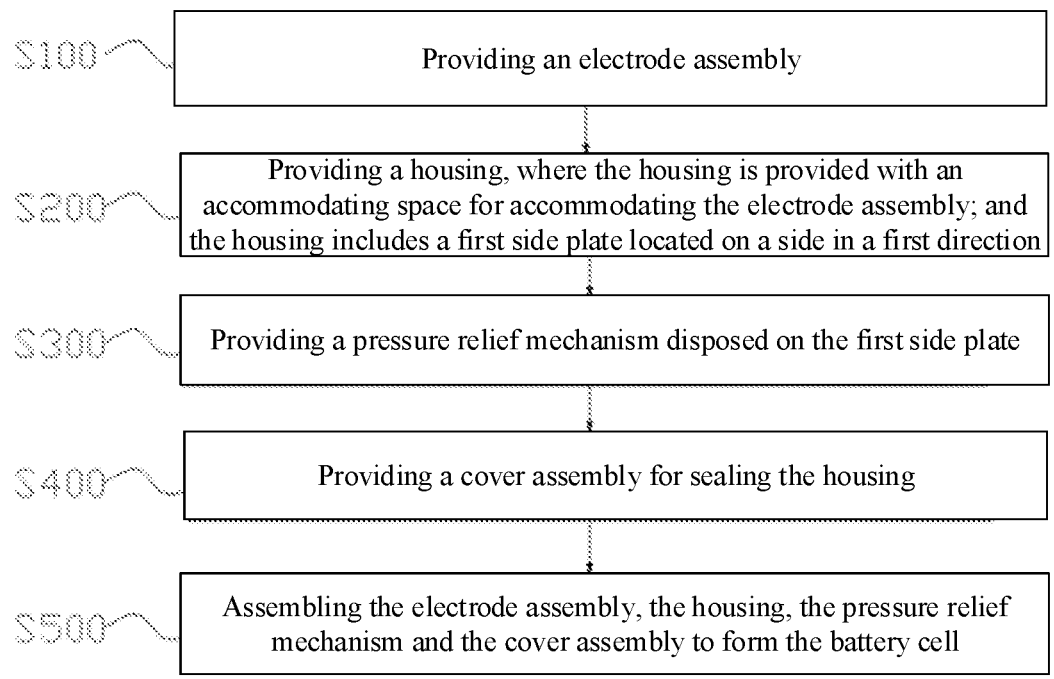
FIG. 22 is a schematic flowchart of a manufacturing method of a battery cell provided by some embodiments of the present application.

FIG. 22 is a schematic flowchart of a manufacturing method of a battery cell provided by some embodiments of the present application.

As shown in FIG. 22, the manufacturing method of the battery cell according to the embodiments of the present application includes:

S100, providing an electrode assembly;

S200, providing a housing, where the housing is provided with an accommodating space for accommodating the electrode assembly; and the housing includes a first side plate located on a side in a first direction;

S300, providing a pressure relief mechanism disposed on the first side plate;

S400, providing a cover assembly for sealing the housing; and

S500, assembling the electrode assembly, the housing, the pressure relief mechanism and the cover assembly to form the battery cell, where the step S200 of providing the housing further includes forming on an inner surface of the first side plate of the housing a first flow channel extending along the inner surface, and the first flow channel is configured to guide a gas in the accommodating space to the pressure relief mechanism so that the pressure relief mechanism is actuated when a pressure reaches a threshold, and relieves the pressure; and the first flow channel comprises a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel.

It should be noted that, for the related structure of the battery cell manufactured by the above manufacturing method of the battery cell, reference can be made to the battery cell provided by the above embodiments.

When the battery cell is assembled based on the above manufacturing method of the battery cell, it is not necessary to execute the above steps in sequence, that is, the steps may be executed in the order mentioned in the embodiment, or may be executed in an order different from the one mentioned in the embodiment, or several steps are executed simultaneously. For example, steps S100, S200, S300, and S400 are executed in no particular order, and may also be executed simultaneously.

Figure 23:
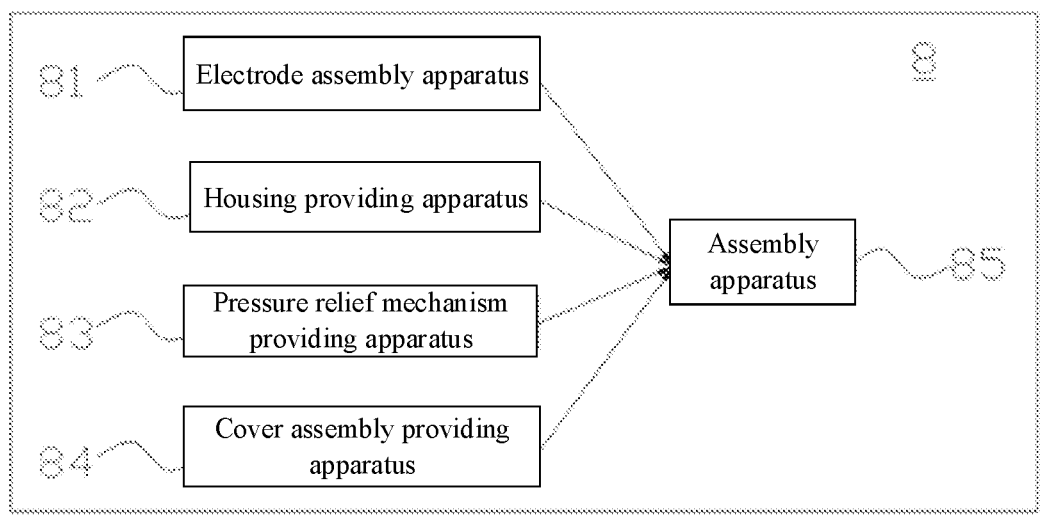
FIG. 23 is a schematic block diagram of a manufacturing system of a battery cell provided by some embodiments of the present application.

FIG. 23 is a schematic block diagram of a manufacturing system of a battery cell provided by some embodiments of the present application.

As shown in FIG. 23, a manufacturing system 8 of a battery cell of the embodiments of the present application includes: an electrode assembly providing apparatus 81 for providing an electrode assembly; a housing providing apparatus 82 for providing a housing, where the housing is provided with an accommodating space for accommodating the electrode assembly; and the housing includes a first side plate located on a side in a first direction; a pressure relief mechanism providing apparatus 83 for providing a pressure relief mechanism, where the pressure relief mechanism is disposed on the first side plate; a cover assembly providing apparatus 84 for providing a cover assembly for sealing the housing; and an assembly apparatus 85 for assembling the electrode assembly, the housing, the pressure relief mechanism and the cover assembly to form the battery cell, where an inner surface of the first side plate of the housing is provided with a first flow channel extending along the inner surface, and the first flow channel is configured to guide a gas in the accommodating space to the pressure relief mechanism so that the pressure relief mechanism is actuated when a pressure reaches a threshold, and relieves the pressure; and the first flow channel comprises a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel.

For the related structure of the battery cell manufactured by the above manufacturing system, reference may be made to the battery cell provided by the above embodiments.

It should be noted that, the embodiments in the present application and features in the embodiments may be combined with each other in case of no conflict.

It should be finally noted that, the above embodiments are merely used for illustrating rather than limiting the technical solutions of the present application. Although the present application is illustrated in detail with reference to the foregoing embodiments, those of ordinary skill in the art should understand that they can still modify the technical solutions described in the foregoing embodiments, or make equivalent substitutions to some of the technical features therein, but these modifications or substitutions can be made to the respective technical solutions without departing from the spirit and scope of the technical solutions of the embodiments of the present application.

What is claimed is:

1. A battery cell, comprising:
an electrode assembly;
a housing provided with an accommodating space for accommodating the electrode assembly, wherein the housing comprises a first side plate located on a side in a first direction; a pressure relief mechanism disposed on the first side plate; and
a cover assembly for sealing the housing,
wherein an inner surface of the first side plate of the housing is provided with a first flow channel extending along the inner surface, and the first flow channel is configured to guide a gas in the accommodating space to the pressure relief mechanism so that the pressure relief mechanism is actuated when a pressure reaches a threshold, and relieves the pressure; and
the first flow channel comprises a first intermediate flow channel and a first edge flow channel, the first edge flow channel extends along a circumferential edge of the inner surface of the first side plate and communicates with the accommodating space, and the first edge flow channel and the pressure relief mechanism are in communication through the first intermediate flow channel.

2. The battery cell according to claim 1, wherein the first intermediate flow channel comprises a first intermediate groove disposed on the inner surface of the first side plate, one end of the first intermediate groove communicates with the pressure relief mechanism, and the other end of the first intermediate groove communicates with the first edge flow channel.

3. The battery cell according to claim 2, wherein there are a plurality of the first intermediate grooves, and each of the first intermediate grooves communicates with the pressure relief mechanism and the first edge flow channel.

4. The battery cell according to claim 3, wherein at least two of the first intermediate grooves are parallel to each other; or
the plurality of first intermediate grooves extend to a periphery in a divergent shape with the pressure relief mechanism as a center.

5. The battery cell according to claim 2, wherein the first edge flow channel comprises a first edge groove disposed at a circumferential edge of the inner surface of the first side plate and extending along the circumferential edge, and each of the first intermediate grooves communicates with the first edge groove.

6. The battery cell according to claim 5, wherein the first edge groove is an annulus or a notched annulus, or the first edge groove comprises a plurality of sub-grooves spaced apart along the circumferential edge.

7. The battery cell according to claim 1, wherein a first protruding part protruding toward the accommodating space is formed on the inner surface of the first side plate, the first protruding part has a top surface away from the inner surface, and the first intermediate flow channel and the first edge flow channel are formed in a space between the top surface of the first protruding part and the inner surface.

8. The battery cell according to claim 7, wherein the first intermediate flow channel comprises a plurality of first intermediate sub-flow channels; there are a plurality of the first protruding parts, the plurality of first protruding parts extend to a periphery in a divergent shape with the pressure relief mechanism as a center and are spaced apart from each other, and one of the first intermediate sub-flow channels is formed between two adjacent first protruding parts and the inner surface of the first side plate;

the housing comprises a pair of second side plates disposed opposite to each other in a second direction perpendicular to the first direction;

the housing further comprises a pair of third side plates disposed opposite to each other in a third direction perpendicular to the first direction and the second direction; and a gap is disposed between an end of each of the first protruding parts away from the pressure relief mechanism and an adjacent second side plate or an adjacent third side plate, and the gap forms a portion of the first edge flow channel.

9. The battery cell according to claim 7, wherein an insulating layer is disposed on the top surface of the first protruding part.

10. The battery cell according to claim 1, wherein starting from a position where the first intermediate flow channel communicates with the pressure relief mechanism, a depth of at least a portion of a length of the first intermediate flow channel gradually decreases in a direction away from the pressure relief mechanism.

11. The battery cell according to claim 1, further comprising:

a support member disposed between the first side plate and the electrode assembly to support the electrode assembly, wherein the support member has a first surface and a second surface disposed opposite to each other, the first surface faces the first side plate, and the second surface faces the electrode assembly;

a second flow channel is disposed on the first surface of the support member; and the first intermediate flow channel and the accommodating space are in communication through the second flow channel.

12. The battery cell according to claim 11, wherein the second flow channel matches the first flow channel in shape.

13. The battery cell according to claim 11, wherein
the support member comprises a first through hole penetrating the support member in the first direction, and the first intermediate flow channel and the accommodating space are in communication through the first through hole.

14. The battery cell according to claim 13, further comprising:

an insulating film configured to wrap a portion of the electrode assembly and separate the electrode assembly and the housing, wherein the insulating film comprises a first side film located between the electrode assembly and the support member; and the first side film comprises a second through hole penetrating the first side film in the first direction, and a projection of the second through hole does not overlap with a projection of the first through hole on the first direction.

15. A battery comprising the battery cell according to claim 1.

16. A power consumption apparatus comprising the battery according to claim 15.

* * * * *